US010931736B2

(12) United States Patent
Brown et al.

(10) Patent No.: US 10,931,736 B2
(45) Date of Patent: Feb. 23, 2021

(54) CONTENT MANAGEMENT SYSTEM USING SOURCES OF EXPERIENCE DATA AND MODULES FOR QUANTIFICATION AND VISUALIZATION

(71) Applicant: Apple Inc., Cupertino, CA (US)

(72) Inventors: Stephen J. Brown, Woodside, CA (US); Andreas Schobel, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 283 days.

(21) Appl. No.: 15/797,607

(22) Filed: Oct. 30, 2017

(65) Prior Publication Data

US 2018/0131753 A1   May 10, 2018

Related U.S. Application Data

(63) Continuation of application No. 14/171,669, filed on Feb. 3, 2014, now Pat. No. 10,666,710, which is a
(Continued)

(51) Int. Cl.
*G06F 17/00* (2019.01)
*H04L 29/08* (2006.01)
(Continued)

(52) U.S. Cl.
CPC .............. *H04L 67/10* (2013.01); *G06F 16/36* (2019.01); *G06F 16/958* (2019.01);
(Continued)

(58) Field of Classification Search
CPC ...... H04L 67/10; G06F 17/248; G06F 16/958; G06F 16/36; G06F 40/186; G06F 9/46; G06Q 10/101; G06Q 50/01
See application file for complete search history.

(56) References Cited

U.S. PATENT DOCUMENTS 6,192,165 B1    2/2001  Irons
6,289,316 B1    9/2001  Aghili et al.
(Continued)

OTHER PUBLICATIONS

Massimiliano Di Penta et al., WS Binder: A Framework to Enable Dynamic Binding of Composite Web Services. In Proceedings of the 2006 International Workshop on Service-Oriented Software Engineering, pp. 74-80, May 2006.*
(Continued)

*Primary Examiner* — Greta L Robinson
(74) *Attorney, Agent, or Firm* — Blank Rome LLP

(57) ABSTRACT

A semantic note taking system and method for collecting information, enriching the information, and binding the information to services is provided. User-created notes are enriched with labels, context traits, and relevant data to minimize friction in the note-taking process. In other words, the present invention is directed to collecting unscripted data, adding more meaning and use out of the data, and binding the data to services. Mutable and late-binding to services is also provided to allow private thoughts to be published to a myriad of different applications and services in a manner compatible with how thoughts are processed in the brain. User interfaces and semantic skins are also provided to derive meaning out of notes without requiring a great deal of user input.

20 Claims, 20 Drawing Sheets

Related U.S. Application Data continuation of application No. 13/462,816, filed on May 3, 2012, now Pat. No. 8,645,383, and a continuation-in-part of application No. 12/924,094, filed on Sep. 20, 2010, now Pat. No. 9,165,064, and a continuation-in-part of application No. 12/322,046, filed on Jan. 27, 2009, now Pat. No. 8,200,757, and a continuation-in-part of application No. 12/381,594, filed on Mar. 13, 2009, now Pat. No. 8,096,477, and a continuation-in-part of application No. 12/802,740, filed on Jun. 11, 2010, now Pat. No. 9,098,574, said application No. 13/462,816 is a continuation-in-part of application No. 13/345,023, filed on Jan. 6, 2012, now Pat. No. 8,930,490, and a continuation-in-part of application No. 12/322,046, filed on Jan. 27, 2009, now Pat. No. 8,200,757, said application No. 13/462,816 is a continuation-in-part of application No. 13/349,733, filed on Jan. 13, 2012, now Pat. No. 9,183,291, and a continuation-in-part of application No. 12/322,046, filed on Jan. 27, 2009, now Pat. No. 8,200,757, said application No. 13/462,816 is a continuation-in-part of application No. 13/349,901, filed on Jan. 13, 2012, now Pat. No. 8,851,380, and a continuation-in-part of application No. 12/381,594, filed on Mar. 13, 2009, now Pat. No. 8,096,477, which is a continuation-in-part of application No. 12/322,046, filed on Jan. 27, 2009, now Pat. No. 8,200,757.

(60) Provisional application No. 61/518,322, filed on May 3, 2011, provisional application No. 61/518,324, filed on May 3, 2011, provisional application No. 61/276,975, filed on Sep. 18, 2009, provisional application No. 61/460,813, filed on Jan. 7, 2011, provisional application No. 61/461,120, filed on Jan. 13, 2011, provisional application No. 61/461,097, filed on Jan. 13, 2011.

(51) Int. Cl.
*G06F 16/36* (2019.01)
*G06F 16/958* (2019.01)
*G06Q 50/00* (2012.01)
*G06Q 10/10* (2012.01)
*G06F 40/186* (2020.01)

(52) U.S. Cl.
CPC ......... *G06F 40/186* (2020.01); *G06Q 10/101* (2013.01); *G06Q 50/01* (2013.01)

(56) References Cited

U.S. PATENT DOCUMENTS

| | | | |
|---|---|---|---|
| 6,366,651 B1 | 4/2002 | Griffith | |
| 7,124,953 B2 | 10/2006 | Anttila | |
| 7,308,254 B1 | 12/2007 | Rissanen | |
| 7,308,473 B1* | 12/2007 | Thomas | G05B 19/4185 707/999.1 |
| 7,499,567 B2 | 3/2009 | Shimosato | |
| 7,533,082 B2 | 5/2009 | Abbott | |
| 7,778,632 B2 | 8/2010 | Kurlander | |
| 7,783,980 B1* | 8/2010 | Herold | G06Q 10/107 715/740 |
| 8,078,450 B2 | 12/2011 | Anisimovich | |
| 8,117,216 B1 | 2/2012 | Chanda | |
| 8,200,757 B2* | 6/2012 | Brown | G06F 16/958 709/204 |
| 8,275,767 B2 | 9/2012 | Shepherd | |
| 8,370,062 B1 | 2/2013 | Starenky | |
| 8,527,357 B1 | 9/2013 | Ganesan | |
| 8,543,403 B1 | 9/2013 | Youngs | |
| 8,645,383 B2 | 2/2014 | Brown | |
| 2002/0099552 A1 | 7/2002 | Rubin | |
| 2002/0120506 A1 | 8/2002 | Hagen | |
| 2002/0125313 A1 | 9/2002 | Broff | |
| 2003/0176183 A1 | 9/2003 | Drucker | |
| 2003/0212554 A1 | 11/2003 | Vatland | |
| 2003/0229522 A1 | 12/2003 | Thompson | |
| 2004/0204635 A1 | 10/2004 | Scharf | |
| 2005/0075900 A1 | 4/2005 | Arguimbau | |
| 2005/0076098 A1 | 4/2005 | Matsubara | |
| 2005/0108686 A1 | 5/2005 | White | |
| 2005/0121504 A1 | 6/2005 | Sanders | |
| 2005/0240444 A1 | 10/2005 | Wooten | |
| 2005/0275871 A1 | 12/2005 | Baird | |
| 2005/0278372 A1* | 12/2005 | Shaburov | G06Q 10/10 |
| 2006/0136393 A1 | 6/2006 | Abbott | |
| 2006/0170693 A1 | 8/2006 | Bethune | |
| 2006/0173985 A1 | 8/2006 | Moore | |
| 2006/0178932 A1 | 8/2006 | Lang | |
| 2006/0206564 A1 | 9/2006 | Burns | |
| 2006/0229918 A1 | 10/2006 | Fotsch | |
| 2006/0294191 A1 | 12/2006 | Marston | |
| 2007/0005151 A1 | 1/2007 | Burton | |
| 2007/0118802 A1 | 5/2007 | Gerace | |
| 2007/0234140 A1 | 10/2007 | Lee | |
| 2007/0244202 A1 | 10/2007 | Murase | |
| 2007/0245229 A1 | 10/2007 | Siedzik | |
| 2007/0245304 A1 | 10/2007 | Curran | |
| 2007/0288993 A1 | 12/2007 | Sakai | |
| 2007/0298399 A1 | 12/2007 | Shao | |
| 2008/0005651 A1 | 1/2008 | Grefenstette | |
| 2008/0021976 A1 | 1/2008 | Chen | |
| 2008/0034056 A1 | 2/2008 | Renger | |
| 2008/0056574 A1 | 3/2008 | Heck | |
| 2008/0066080 A1* | 3/2008 | Campbell | G06F 16/958 719/314 |
| 2008/0082548 A1 | 4/2008 | Betts | |
| 2008/0098352 A1 | 4/2008 | Hawley | |
| 2008/0109429 A1 | 5/2008 | Petrin | |
| 2008/0114829 A1* | 5/2008 | Button | H04W 4/029 709/203 |
| 2008/0114845 A1 | 5/2008 | Rao | |
| 2008/0133488 A1 | 6/2008 | Bandaru | |
| 2008/0133716 A1 | 6/2008 | Rao | |
| 2008/0182587 A1 | 7/2008 | Bennett | |
| 2008/0243834 A1 | 10/2008 | Rieman | |
| 2008/0248801 A1 | 10/2008 | Fletcher | |
| 2008/0294607 A1 | 11/2008 | Partovi | |
| 2008/0294760 A1 | 11/2008 | Sampson | |
| 2008/0320107 A1 | 12/2008 | Park | |
| 2009/0006547 A1 | 1/2009 | Banatwala | |
| 2009/0013250 A1 | 1/2009 | Hsieh | |
| 2009/0018820 A1 | 1/2009 | Sato | |
| 2009/0019494 A1 | 1/2009 | Kim | |
| 2009/0024641 A1 | 1/2009 | Quigley | |
| 2009/0037832 A1* | 2/2009 | Falchuk | G06Q 30/02 715/764 |
| 2009/0055377 A1 | 2/2009 | Hedge | |
| 2009/0063099 A1 | 3/2009 | Counts | |
| 2009/0099872 A1 | 4/2009 | Gordon | |
| 2009/0111487 A1 | 4/2009 | Scheibe | |
| 2009/0132941 A1 | 5/2009 | Pilskalns | |
| 2009/0171939 A1 | 7/2009 | Athsani | |
| 2009/0210391 A1 | 8/2009 | Hall | |
| 2009/0219159 A1 | 9/2009 | Morgenstern | |
| 2009/0276709 A1 | 11/2009 | Venneman | |
| 2009/0276722 A1 | 11/2009 | Segel | |
| 2009/0319181 A1 | 12/2009 | Khosravy | |
| 2009/0319504 A1 | 12/2009 | Alberth, Jr. | |
| 2010/0005061 A1 | 1/2010 | Basco | |
| 2010/0005135 A1 | 1/2010 | Yang | |
| 2010/0057485 A1 | 3/2010 | Luft | |
| 2010/0060586 A1 | 3/2010 | Pisula | |
| 2010/0070448 A1 | 3/2010 | Omoigui | |
| 2010/0075697 A1 | 3/2010 | Gupta | |
| 2010/0076784 A1 | 3/2010 | Greenburg | |
| 2010/0121157 A1 | 5/2010 | Espina | |
| 2010/0217741 A1 | 8/2010 | Loftus | |

(56) References Cited

U.S. PATENT DOCUMENTS

| | | |
|---|---|---|
| 2010/0223341 A1 | 9/2010 | Manolescu |
| 2010/0228712 A1 | 9/2010 | Wexler |
| 2010/0268659 A1 | 10/2010 | Zimberoff |
| 2010/0287159 A1 | 11/2010 | Abajian |
| 2011/0112047 A1 | 5/2011 | Evans |
| 2011/0173264 A1 | 7/2011 | Kelly |
| 2011/0191417 A1 | 8/2011 | Rathod |
| 2012/0095805 A1 | 4/2012 | Ghosh |
| 2012/0143597 A1 | 6/2012 | Mushtaq |
| 2013/0067547 A1 | 3/2013 | Thavasi |
| 2013/0097688 A1 | 4/2013 | Bradley, II |
| 2013/0160072 A1 | 6/2013 | Reus |
| 2013/0216982 A1 | 8/2013 | Bennett |
| 2013/0268357 A1 | 10/2013 | Heath |
| 2014/0157401 A1 | 6/2014 | Alameh |
| 2014/0279544 A1 | 9/2014 | Baird |
| 2015/0026823 A1 | 1/2015 | Ramesh |
| 2015/0143546 A1 | 5/2015 | Bradley, II |
| 2015/0186660 A1 | 7/2015 | Sherrets |

OTHER PUBLICATIONS

"Facebook plans to add 'place' feature" by John D. Sutter, CNN, Mar. 26, 2010.

Takashi Yoshino et al., "NAMBA: Location-Aware Collaboration System for Shopping and Meeting," IEEE Transactions on Consumer Electronics, vol. 3, Aug. 2002, pp. 470-477.

\* cited by examiner

CONTENT MANAGEMENT SYSTEM USING SOURCES OF EXPERIENCE DATA AND MODULES FOR QUANTIFICATION AND VISUALIZATION

CROSS REFERENCE TO RELATED APPLICATIONS

This application is a continuation of U.S. patent application Ser. No. 14/171,669 filed Feb. 3, 2014 which is a continuation of U.S. patent application Ser. No. 13/462,816 filed May 3, 2012. This application claims priority from U.S. Provisional Patent Application 61/518,322 filed May 3, 2011.

This application is a continuation of U.S. patent application Ser. No. 14/171,669 filed Feb. 3, 2014 which claims priority from U.S. Provisional Patent Application 61/518,324 filed May 3, 2011.

This application is a continuation of U.S. patent application Ser. No. 14/171,669 filed Feb. 3, 2014 which is a continuation-in-part of U.S. patent application Ser. No. 12/924,094 filed Sep. 20, 2010. U.S. patent application Ser. No. 12/924,094 filed Sep. 20, 2010 claims priority from U.S. Provisional Patent Application 61/276,975 filed Sep. 18, 2009. U.S. patent application Ser. No. 12/924,094 filed Sep. 20, 2010 is a continuation-in-part of U.S. patent application Ser. No. 12/322,046 filed Jan. 27, 2009, Ser. No. 12/381,594 filed Mar. 13, 2009, and Ser. No. 12/802,740 filed Jun. 11, 2010.

This application is a continuation of U.S. patent application Ser. No. 14/171,669 filed Feb. 3, 2014 which is a continuation-in-part of U.S. patent application Ser. No. 13/345,023 filed Jan. 6, 2012. U.S. patent application Ser. No. 13/345,023 filed Jan. 6, 2012 claims priority from U.S. Provisional Patent Application 61/460,813 filed Jan. 7, 2011. U.S. patent application Ser. No. 13/345,023 filed Jan. 6, 2012 is a continuation-in-part of U.S. patent application Ser. No. 12/322,046 filed Jan. 27, 2009.

This application is a continuation of U.S. patent application Ser. No. 14/171,669 filed Feb. 3, 2014 which is a continuation-in-part of U.S. patent application Ser. No. 13/349,733 filed Jan. 13, 2012. U.S. patent application Ser. No. 13/349,733 filed Jan. 13, 2012 claims priority from U.S. Provisional Patent Application 61/461,120 filed Jan. 13, 2011. U.S. patent application Ser. No. 13/349,733 filed Jan. 13, 2012 is a continuation-in-part of U.S. patent application Ser. No. 12/322,046 filed Jan. 27, 2009.

This application is a continuation of U.S. patent application Ser. No. 14/171,669 filed Feb. 3, 2014 which is a continuation-in-part of U.S. patent application Ser. No. 13/349,901 filed. Jan. 13, 2012. U.S. patent application Ser. No. 13/349,901 filed Jan. 13, 2001 claims priority from U.S. Provisional Patent Application 61/461,097 filed Jan. 13, 2011. U.S. patent application Ser. No. 13/349,901 filed Jan. 13, 2011 is a continuation-in-part of U.S. patent application Ser. No. 12/381,594 filed Mar. 13, 2009. U.S. patent application Ser. No. 12/381,594 filed Mar. 13, 2009 is a continuation-in-part of U.S. patent application Ser. No. 12/322,046 filed Jan. 27, 2009.

All applications listed in this section "Cross Reference to Related Applications" are hereby incorporated by reference to this application in their entirety.

FIELD OF THE INVENTION

The invention relates generally to online social media. More particularly, the present invention relates to collecting and enriching information in a network environment.

BACKGROUND

Today, a tremendous number of online services and applications are available. The existing online services are related to virtually every aspect of life, including work, relationships, health, entertainment, news, etc. Access to these online services typically only requires an Internet connection. However, the abundance of services also causes information overload. As a result, disorganized information is floating around many users' lives and brains. Instead of positively influencing our lives, the services become cumbersome and are often neglected. In particular, the advent of social media has made it easier to share information with more people and make connections with people who we otherwise would not. However, the ubiquity of social media (such as through social networks) has created a further explosion in the information content of our lives and relationships. This information clutter reduces a user's productivity and shortens the user's attention span.

Typically, ideas begin with private thoughts that are later refined and shared to friends and, perhaps, the public at large. Who these ideas are to be shared with often evolve over time. Existing online services are not amenable to this process of developing ideas and deciding where to share them at a later time. For example, existing social media forces ideas immediately into the public domain. Information or media posted on social networks (e.g. Facebook.com. Twitter.com, and Flickr.com) or blogs (e.g. Wordpress.com and Blogger.com) are immediately accessible by other users. To post information in existing social media requires upfront cognitive decision-making related to the audience level of the information at the time the information was collected or generated. This process does not match the way human brains function.

Systems, such as emailing to oneself and note-taking applications (e.g. Evernote.com) exist for users to store private thoughts. However, these existing systems are not integrated with other services or applications. In other words, a user would have to access and sign on to multiple applications simultaneously to utilize information stored in the application storing the private thoughts. Because of the lack of integration and inconvenience of these systems, they are seldom used, therefore, ideas are often forgotten. In addition, existing note-taking applications require users to provide all of the information content to the note. By forcing a user to provide all of the information content, the note-taking process is typically tedious, error-prone, and incomplete.

The present invention addresses at least the above-described difficult problems and advances the art with a semantic note taking system and method.

SUMMARY OF THE INVENTION

The present invention is directed to a semantic note taking system and method for collecting information, enriching the information, and binding the information to services. A plurality of users are communicatively connected to an application server to create one or more notes that can be bound to one or more of a plurality of services and stored in a database. The application server operates a plurality of functions, including a note taking function for allowing each of the users to create one or more notes, a categorizing function for labeling each of the notes with one or more changeable categories, a context function for associating one or more context traits with each of the notes, a binding function to establish one or more changeable binding rules for each of the notes, wherein the binding rules determine one or more of the services where the note is to be bound, and wherein the binding rules are related to the content of the note, the categories of the note, the context traits of the note, a user binding selection, or any combination thereof, and a communication function for communicating each of the notes to one or more of the services where the note is to be bound.

A note includes text, audio media, visual media, audio-visual media, recorded data, a weblink, a pointer to an information source, or any combination thereof. In an embodiment, one or more of the context traits associated with the note includes a time, a location, physical data relating to the user device used to generate the note, or any combination thereof. In another embodiment, relevant data is derived based on one or more of the context traits and the relevant data is attached to the note. The relevant data can be derived by matching one or more of the context traits with data from an information module such as a calendar, an address book, a contact list, a user profile, a user history, or any combination thereof. In an embodiment, one or more of the context traits associated with the note is based on one or more categories of the note, the content of the note, a user history, or any combination thereof.

In a preferred embodiment, the binding rules include one or more publication properties, such as an audience level for the note and/or one or more locations to publish the note. The locations to publish the note can include a private domain of the user, one or more friends of the user, one or more computer-implemented social networks, a blog, an online discussion board, a website, or any combination thereof. In an embodiment, the binding rules are automatically determined based at least partially on one or more of the categories, one or more context traits, the note content, a user history, or any combination thereof.

The application server of an embodiment of the present invention operates a suggestion function for suggesting one or more services, binding rules, and/or categories. The suggestions can be based at least partially on one or more the categories, one or more of the context traits, the note content, a user history, one or more binding rules, or any combination thereof. In an embodiment, a note is automatically bound to one of the suggested services. Preferably, the suggestion function uses a user history of selections of services and/or categories.

In an embodiment of the present invention, a user interface is provided to allow user entry of the categories and binding rules for a note, wherein the user interface includes a first symbol associated with the categories of the note and a second symbol associated with the binding rules of the note. Preferably, the user entry of the first symbol triggers a display of one or more of the categories suggested to the user and selectable by the user. Similarly, the user entry of the second symbol triggers a display of one or more of the binding rules suggested to the user and selectable by the user. In another embodiment, a user interface corresponding to each of the services where a note can be bound is provided. Each of the service-specific user interfaces includes one or more buttons for initiating an action for the service corresponding to the user interface. Preferably, a single click of one of the buttons initiates creation of the note, automatic addition of content to the note, automatic labeling of the note with categories, and communication of the note to the service corresponding to the user interface.

In an embodiment, the user device operated by users to access the application server is a mobile device that communicates with the application server over a wireless network. The services where a note can be bound are selected from the group consisting of a website, a web application, a computer-implemented social network, a blog, a review website, a product review website, an entertainment website, a health application, a medical application, an online retailer, an email application, a research application, a clinical application, a calendar, and an address book.

In another embodiment a method for collecting information and enriching information. A note taking function is provided for allowing a user to create a note on a user device. The created note can then be stored either on the user device or remotely via an application server. Examples of notes are text, audio media, visual media, audio-visual media, recorded data, a weblink, a pointer to an information source, or any combination thereof.

An identification function is used to identify or capture the user's interests and needs from a plurality of sources of experience data. Examples of sources of experience data are one or more social networks, one or more financial services, one or more note-taking services, one or more location check-in apps, one or more email programs, one or more photo-sharing services, one or more calendars, or any combination thereof. It is noted that the user is registered which these sources (i.e. linked accounts or services), which allows the function to gain access to the data pertaining interests and needs of the user.

A template function is used for defining one or more templates for organizing data capture and visualizing the organized data. The templates can then be stored either on the user device or remotely via an application server. Templates can also be automated based on context. Templates can also be a suggested list of templates.

A pre-selection function is used for selecting one or more of the stored templates based on the identified user interests and needs and based on the created note. The user can manually select a template from a list or a list of suggested templates. Templates can also be suggested to the user in an automated fashion.

In one aspect, a feedback function could be used for providing the enriched note to said user. This function performs based on the pre-selected template a quantitative analysis and a visualization of the quantitative analysis to the user of the enriched note.

Similarly to this method, a system for collection information and enriching the information is provided. An application server is used to communicatively connect a plurality of users to the application server to create one or more notes. A plurality of services are communicatively connected to the application server, and the notes can be bound to one or more of these services. A database is used for storing the notes created by said users. The application server operates a plurality of functions such as (described supra) the note taking function, the identification function, the template function, the pre-selection function, and the feedback function.

BRIEF DESCRIPTION OF THE FIGURES

The present invention together with its objectives and advantages will be understood by reading the following description in conjunction with the drawings, in which.

DETAILED DESCRIPTION OF THE INVENTION

The abundance of online services provides users with opportunities to perform many tasks and connect with numerous people from nearly any location. However, the large number of services often cause information overload and a user cannot efficiently organize the explosion of information content concerning the user's life, work, and relationships. The present invention is directed to a semantic note taking system and method to collect, enrich, and bind information to services. Semantic note taking allows users to effortless offload information from private thought streams for later determination of where to bind these thoughts. In addition, semantic note taking minimizes the friction to record and share ideas by automatically enriching the note and reducing unnecessary user input. In other words, the present invention is directed to a system and method to collect unscripted data, add more meaning and use out of the data, and bind the data to services.

Figure 1:
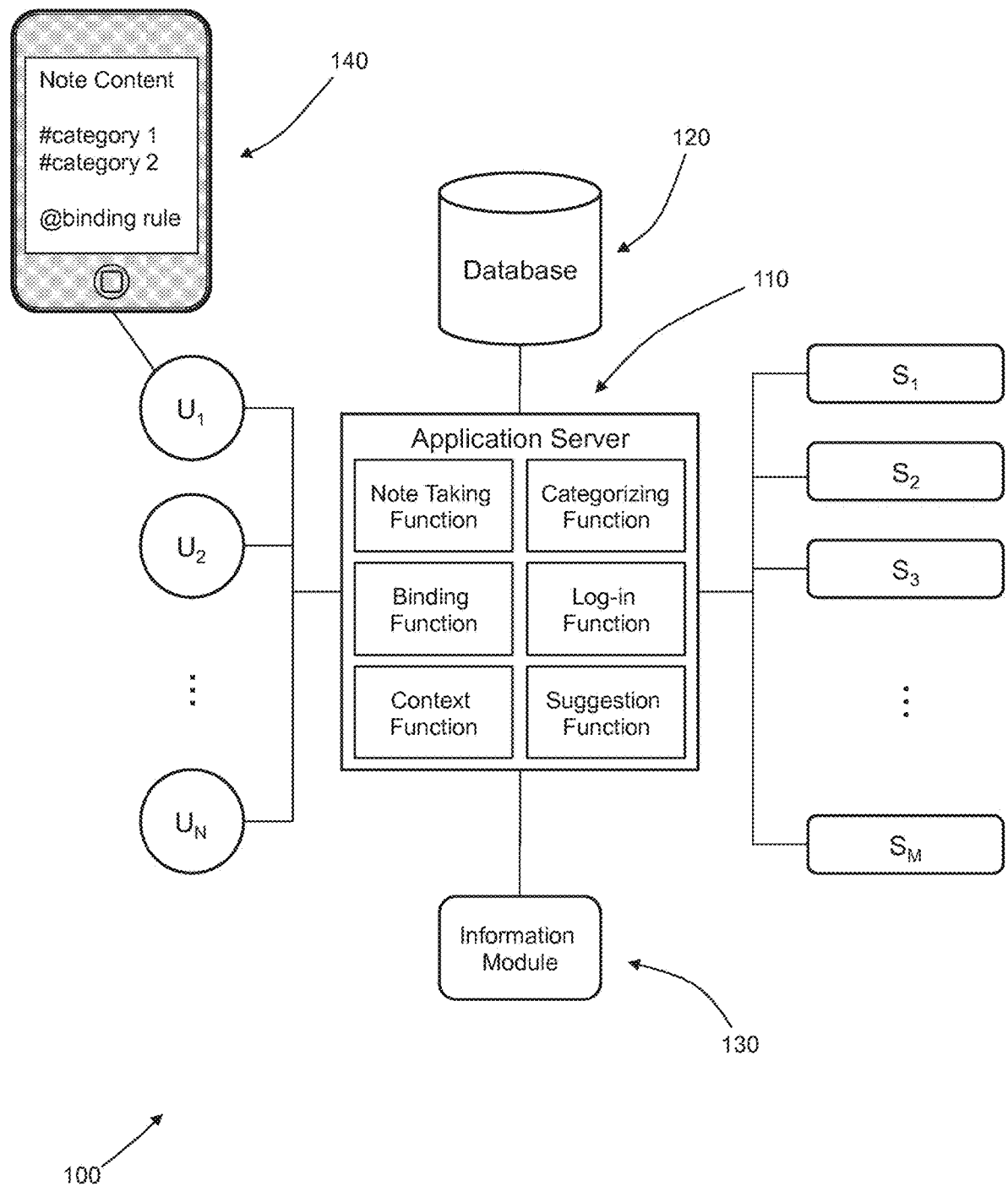
FIG. 1 shows an example of a semantic note taking system according to an embodiment of the present invention.

FIG. 1 shows a preferred embodiment of a semantic note taking system 100 according to the present invention. The semantic note taking system 100 includes an application server 110 that is accessible by a plurality of users $U_1$-$U_N$ for creating one or more notes, categorizing the notes, and binding the notes to one or more services $S_1$-$S_M$. The users $U_1$-$U_N$ connect to the application server 110 through any device capable of being communicatively connected to a network, such as the Internet. The user devices can include a computer, a laptop, a personal digital assistant (PDA), a cell phone, a mobile device, or a smart phone. FIG. 1 shows user $U_1$ with a mobile phone 140 that is connected to the application server 110, such as through a wireless network.

A note taking function, operated by the application server 110, allows each of the users $U_1$-$U_N$ to create one or more notes. Notes can include text, audio media, visual media, audio-visual media, recorded data, a weblink, a pointer to an information source (e.g. a bookmark), or any other type of data. Notes created by the users $U_1$-$U_N$ are transmitted from the user devices to the application server 110 and stored in the database 120 for later binding to one or more of the services $S_1$-$S_M$.

The application server 110 also operates a categorizing function to label the notes with one or more categories. In an embodiment, the categorizing function allows users $U_1$-$U_N$ to label the notes, though automatic or suggested note labeling is also possible. It is noted that one or more of the categories of each note is changeable. Labeling a note with categories enriches the note. The note is further enriched by the context function operated by the application server 110, which associates one or more context traits with the note. Context traits associated with a note can be based on one or more of the categories of the note, the content of the note, a user history, or any combination thereof. Examples of context traits include a time, a location, and physical data relating to the user device. For example, the mobile phone 140 of user $U_1$ is capable of measuring the location where the note was created (e.g. by using GPS measurements) and this location can be automatically associated with the note without user input, thereby enriching the note.

Context information is not restricted to a time-stamp or location-stamp associated with the note. In a preferred embodiment of the present invention, relevant data is derived based on one or more of the context traits. Relevant data can be derived by matching one or more of the context traits with data from an information module 130, such as a calendar, an address book, a contact list, a user profile, a user history, or any combination thereof. For example, a time context trait when the note is created is matched with a meeting time indicated by a calendar information module. Because the calendar includes relevant data, e.g. the participants of the meeting and the discussion topics of the meeting, this relevant data can be attached to the note to further enrich the note.

A binding function is provided to establish one or more binding rules for a note. The binding rules determine one or more services $S_1$-$S_M$ or applications where the note is to be bound. The binding rules are related to the content of the note, the categories of the note, the context traits of the note, a user binding selection, or any combination thereof. In an embodiment, the binding rules of a note are automatically determined based at least partially on one or more categories of the note, one or more context traits, the content of the note, the user history, or any combination thereof.

The services $S_1$-$S_M$ where a note can be bound can include a website, a web application, a computer-implemented social network, a blog, a review website, a product review website, an entertainment website, a health application, a medical application, an online retailer, an email application, a research application, a clinical application, a calendar, an address book, or any combination thereof. A note that is bound to a service is communicated to the service. What is done with the note after it is communicated depends on the particular functions of the service and the content of the note. For example, a note bound to a blog could be published on the blog and a note bound to a research application can include data for analysis by the research application. In addition to communicating a note to a service, in an embodiment of the present invention, data can be extracted from the service where the note is bound and the extracted data is added to the note.

The services $S_1$-$S_M$ shown in FIG. 1 are generally not integrated and some of the services $S_1$-$S_M$ where a note can be bound may also require user login or authentication. To facilitate the integration of the services and allow access to the services, in an embodiment, the application server 110 includes a login function to provide login information for access to the services. Integration of the services enables a user to collect or create information content and offload the content to a single location, instead of having to interact with a myriad of different services separately.

Figure 2:
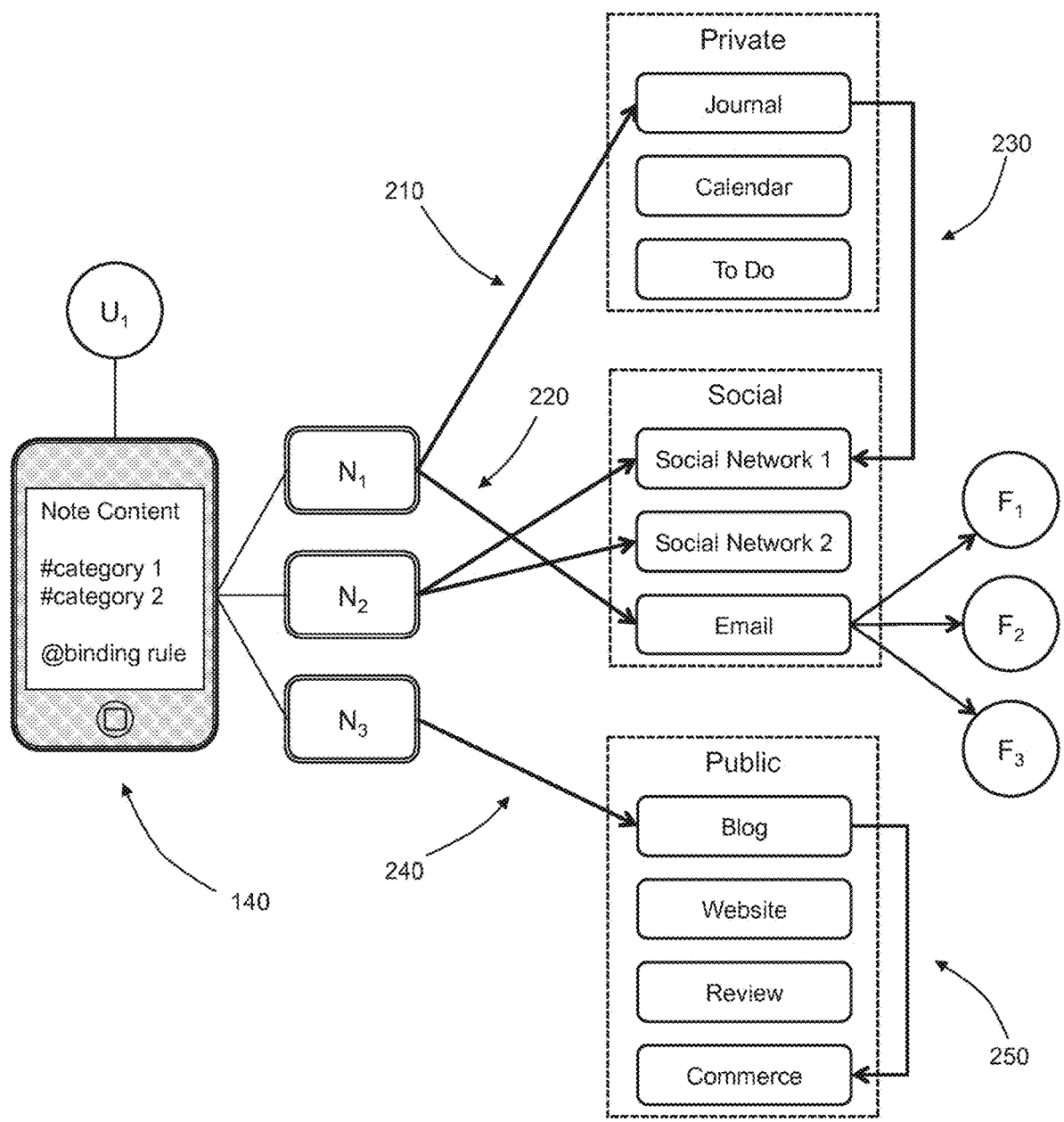
FIG. 2 shows an example of mutable binding of notes to multiple services according to an embodiment of the present invention.

In a preferred embodiment of the present invention, the binding rules comprise one or more publication properties. The publication properties include an audience or privacy level for the note and the location to publish the note. FIG. 2 shows three notes $N_1$, $N_2$, and $N_3$ created by user $U_1$ and the binding of these notes to different services. The audience levels generally include private, social, and public designations. The locations to publish the note includes a private domain of the user, one or more friends $F_1$-$F_3$ of the user, one or more computer-implemented social networks, a blog, an online discussion board, a website, or any combination thereof. FIG. 2 shows note $N_1$ bound 210 to a private journal and bound 220 to an email application. In other words, the binding rules for note $N_1$ indicate that the note should be communicated to the journal service and the email application with the appropriate audience levels.

A note can be bound to any number of services at any time. Importantly, the binding of the note is changeable. In other words, a user can change the binding rules to alter the location where a note is to be bound. In FIG. 2, note $N_1$ is originally bound 210 to a journal but is later bound 230 to Social Network 1. Similarly, note $N_3$ is originally bound 240 to a blog, but is later bound 250 to an electronic commerce website. The mutable binding rules and late-binding method of the present invention is in accord with how ideas are typically generated in our brains. In particular, ideas and information typically start as private thoughts that are later shared and discussed with people we know. Finally, the information is published to the world. This is in contrast to existing social media where generated media are forced immediately into the public realm.

FIG. 2 also shows note $N_1$ published and communicated to associates or friends $F_1$-$F_3$ of user $U_1$. By publishing note $N_1$ to friends $F_1$-$F_3$, an ad hoc community or an ad hoc social network is developed around note $N_1$. In an embodiment, one or more of the friends $F_1$-$F_3$ can change the note $N_1$. In particular, data can be extracted from one of the friends $F_1$-$F_3$ and the extracted data is added to the note $N_1$.

Figure 3:
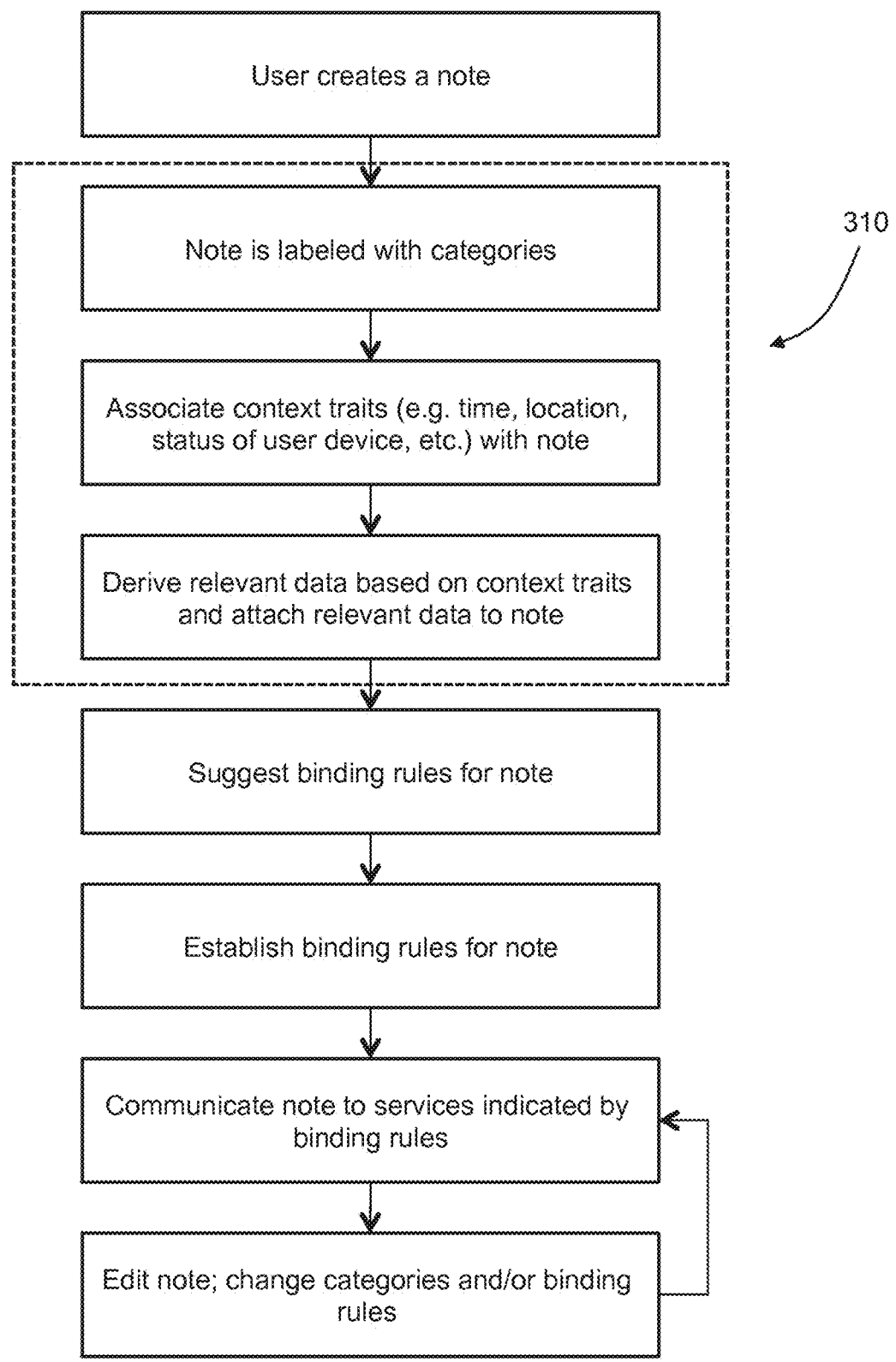
FIG. 3 shows a flow chart of an example note creation, enrichment, and binding according to an embodiment of the present invention.
Figure 4:
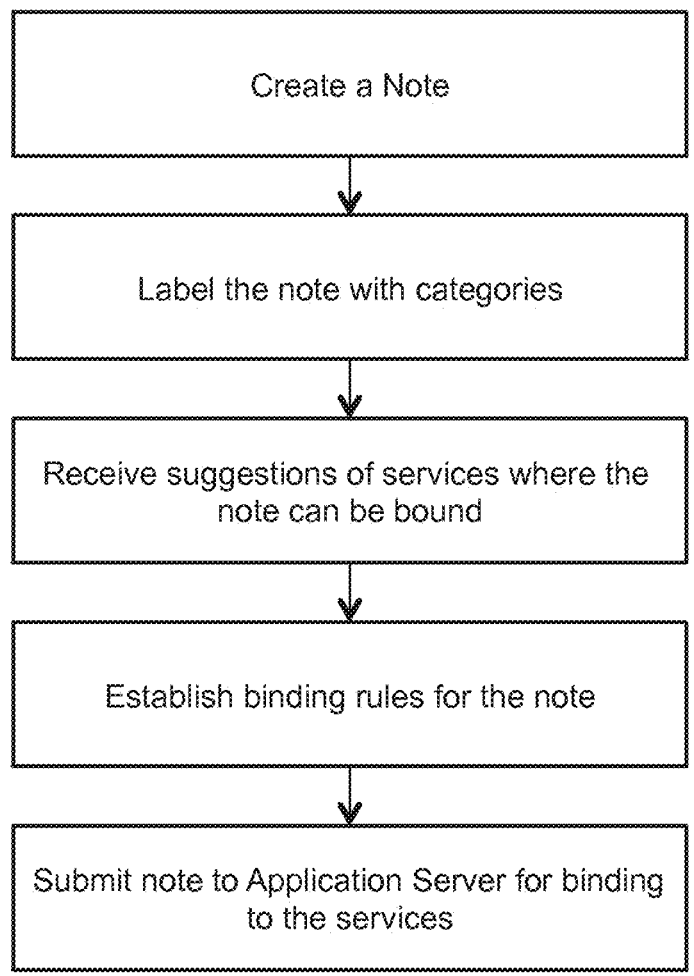
FIG. 4 shows a flow chart of example steps taken by a user according to an embodiment of the present invention n.

FIG. 3 and FIG. 4 show flow charts for exemplary methods of creating, enriching, and binding the notes according to the present invention. The steps circled with a dashed line 310 in FIG. 3 show the enrichment of the notes by labeling the note with categories, associating context traits with the note, and deriving relevant data based on the context traits. FIG. 4 shows the steps undertaken by a user of the semantic note taking system of the present invention.

Figure 5:
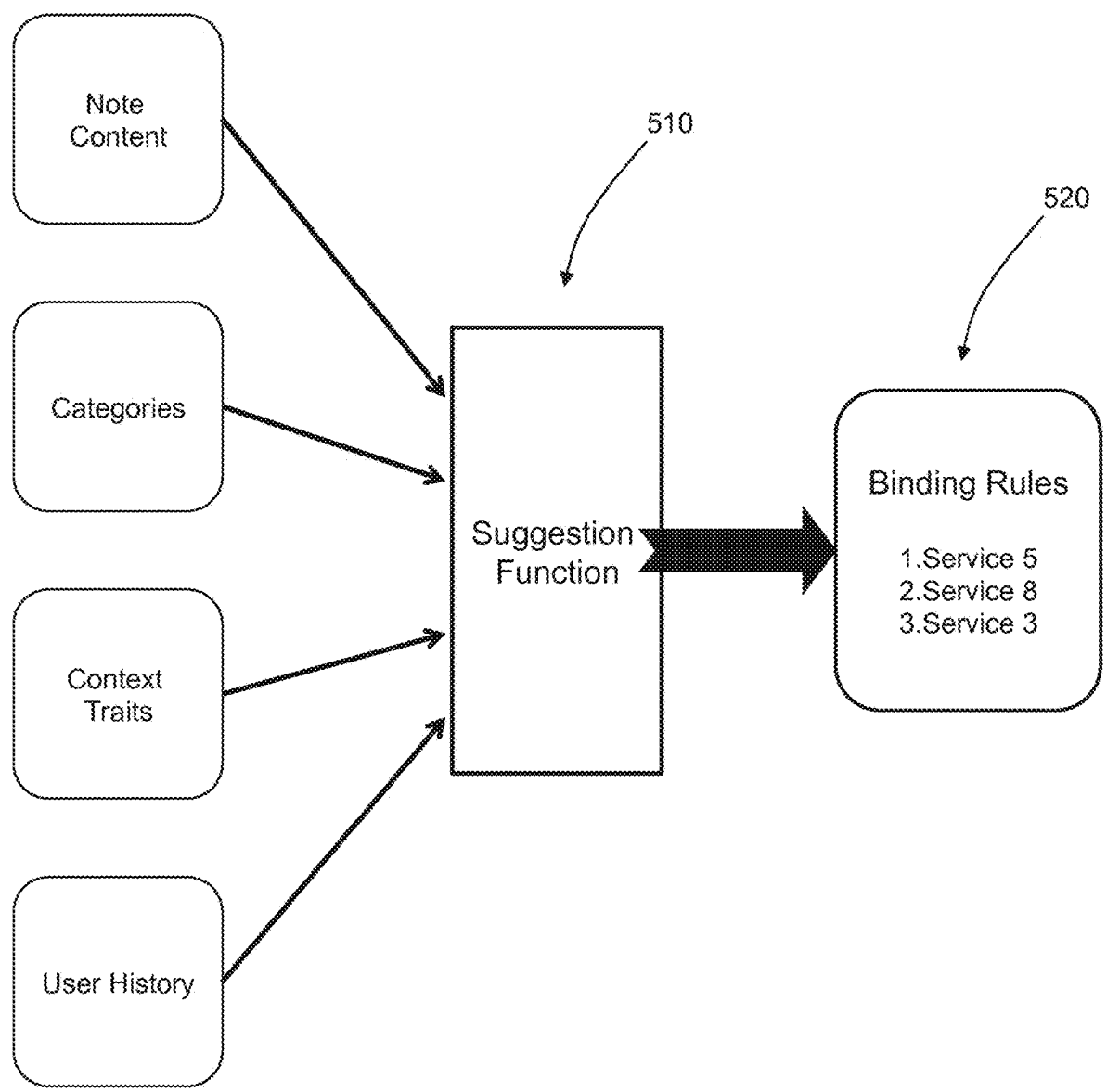
FIG. 5 shows an example of a suggestion function according to the present invention.

FIG. 3 and FIG. 4 also include the steps of suggesting binding rules and receiving suggestions, respectively. The application server operates a suggestion function for suggesting one or more services where the note can be bound to the user who created the note. FIG. 5 shows the inputs for the suggestion function 510, which can include the content of the note, the categories of the note, the context traits, and/or the user history. Based on these inputs, the suggestion function 510 suggests binding rules 520, such as a list of suggested services where the note can be bound. For example, FIG. 5 shows a ranked list of services with "Service 5" being the top-ranked service where the note can be bound.

In an embodiment, the suggested services or binding rules are selectable by the user, where the user selection binds the note to the selected service. User selections can be stored for reference by the suggestion function. For example, a first note is created by a user, labeled with "Category 4", and bound to "Service 5" by user selection. Because of this user selection, "Service 5" would be suggested for a second note also labeled with "Category 4". It is noted that the first and second notes can be created by the same user, or they can be created by different users. In other words, the suggestion function 510 can rely on the user history of the same user or the user history of a community of users. It is noted that the association of a service to a category is mutable and evolvable depending on user behavior. For example, though "Category 4" and "Service 5" are associated in the above example, the association of services for "Category 4" could change to "Service 3" if users frequently alter the selection from "Service 5" to "Service 3" for notes having a label of "Category 4".

In an embodiment, a note is automatically bound to one of the suggested services without user selection. In a preferred embodiment, the storage of past user selections enables intelligent and automatic binding of notes to services. Automatic binding of notes to services reduces the need for user input.

The suggestion function 510 is also capable of suggesting categories to label a note in addition to or replacement of suggesting binding rules. Suggestions of categories can be analogous to the suggestions of services described in the previous paragraphs. In particular, suggestions of categories can be based on the content of the note, the context traits of the note, other categories of the note, a user history, the binding rules established for the note, the services determined by the binding rules, or any combination thereof. For example, a note contains a description of a product. Based on this note content, a category named "product" is suggested to the user for labeling the note. In another example, the association of a service and a category based on a user history can be used to suggest one or more categories for notes having binding rules with that particular service. In an embodiment, a note is automatically labeled with one or more suggested categories.

Figure 6:
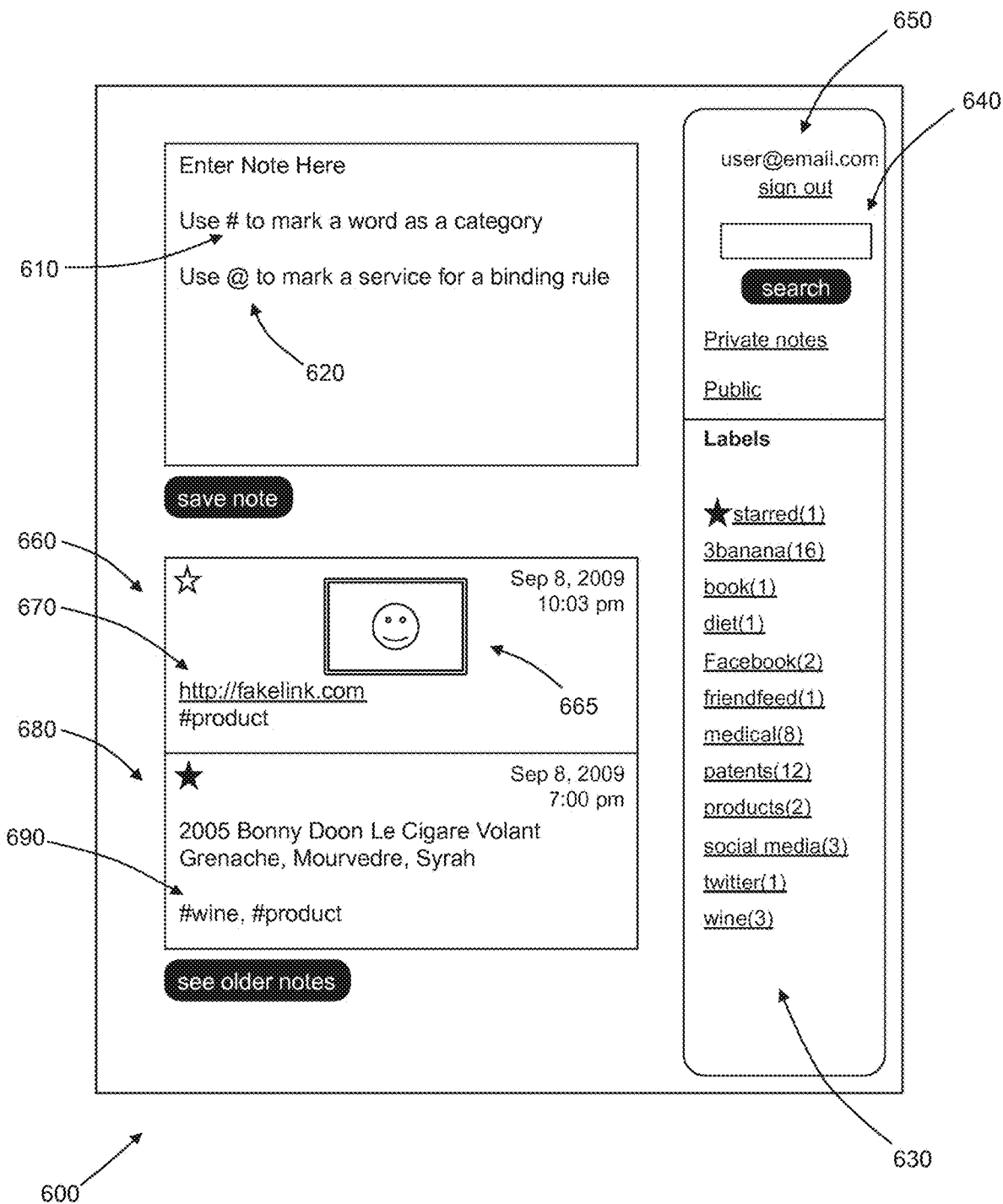
FIG. 6 shows an example user interface for semantic note taking according to an embodiment of the present invention.

FIG. 6 shows an example user interface 600 for user creation of a note and user entry of categories and binding rules for the note. In an embodiment, the user interface 600 is accessible via a web browser. However, alternative methods of accessing user interfaces known in the art may also be used. In a preferred embodiment, the user interface 600 allows user entry of a first symbol 610 to designate entry of a category and a second symbol 620 to designate entry of a binding rule. As shown in FIG. 6, the first symbol 610 is the "#" sign and categorization is accomplished by placing a "#" symbol adjacent to a word. Similarly, the second symbol 620 is the "@" sign to mark a service for a binding rule. The first 610 and second 620 symbols allow easy entry of categories and binding rules. As can be appreciated by one or ordinary skill in the art, the present invention is not limited to the use of symbols for categorization and binding rules.

In a preferred embodiment, entry of the first symbol 610 triggers a list of previously used categories to be displayed to the user. In particular, the list can be filtered to only include categories that may be relevant to the note, such as based on the content of the note or the context traits of the note. In an embodiment, users can override suggestions and label the note with non-suggested category or a new category. Similarly, entry of the second symbol 620 triggers a list of services or binding rules to be displayed to the user. In a preferred embodiment, user selection of a category to label the note triggers a display of suggested services where the note can be bound. Conversely, user selection of a binding rule triggers a display of suggested categories to label the note. The suggestions can be based on previously stored user selections, i.e. a user history, or any other bases as described herein with respect to the suggestion function.

The user interface 600 also includes a list of categories 630 used in all stored notes. A user can select a category from the list 630 to view notes labeled with the selected category. In an embodiment, a search box 640 is also available to find previously saved notes. FIG. 6 also shows previously saved notes 660 and 680. The note 660 includes a photo 665 and a weblink 670. The note 680 includes text description of a wine and is labeled 690 with the categories "wine" and "product" by use of the first symbol. The user interface 600 also includes a user name 650, such as the user's email address. In an embodiment, the application server requires a user authentication to access the semantic note taking system.

Embodiments of the present invention are also directed to user interfaces corresponding to services to facilitate simple collection of data and binding to services. In an embodiment, a user interface is provided for each of the services where a note can be bound. The user interface corresponding to a particular service includes one or more buttons for initiating an action specific to that service. Service specific user interfaces are referred to as semantic skins. In a preferred embodiment, a single click of a button on a semantic skin initiates the creation of a note, automatic content generation and addition to the note, automatic labeling of the note with one or more categories appropriate to the service, and communication of the note to the service.

Figure 7A:
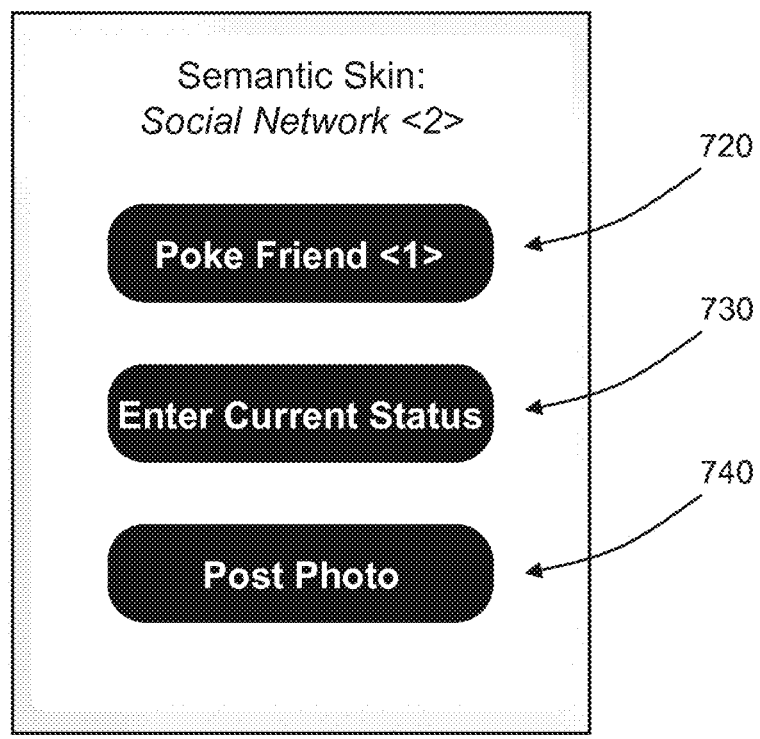
FIG. 7A and FIG. 7B show examples of semantic skin user interfaces corresponding to services according to an embodiment of the present invention.
Figure 7B:
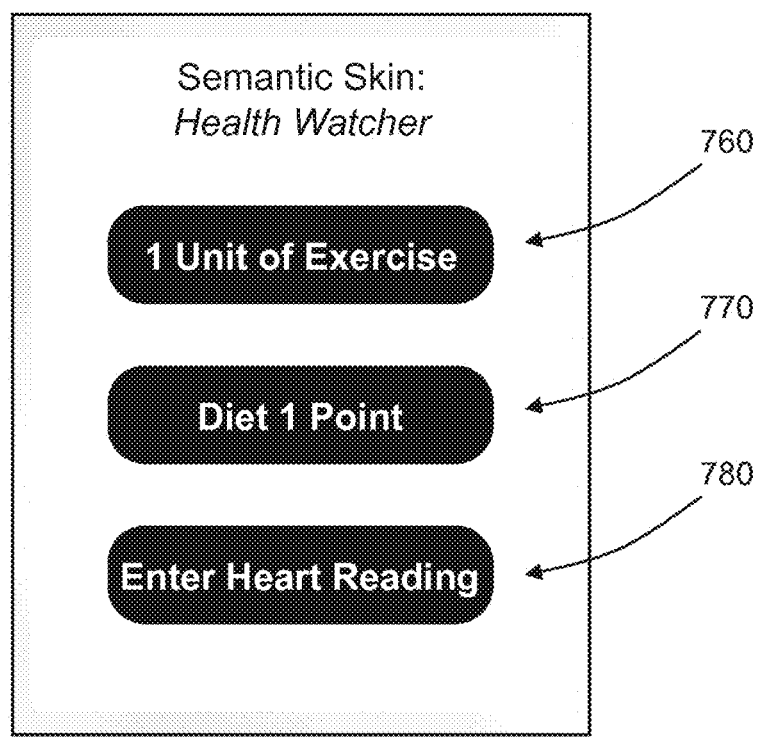

FIG. 7A shows an example of a semantic skin 710 for a social network service and FIG. 7B shows an example of a semantic skin 750 for a health or diet application. The semantic skin 710 includes a button 720 to "poke" a friend of the user in the social network, a button 730 to submit the current status of the user, and a button 740 to post a photo to the social network The semantic skin 750 in the example shown by FIG. 7B includes a button 760 to enter exercise activity, a button 770 to enter diet information, and a button 780 to measure medical readings. The semantic skins can rely on context traits derived from the device where the data entry is performed. For example, the button 730 of semantic skin 710 can utilize the current location of the user as measured by the user device and publish that location to the social network. In another example, a user is operating a device that includes a heart monitor and the button 780 extracts heart rate measurements, attaches the measurements to a note, and communicates the note to a health service.

In a preferred embodiment, buttons in user interfaces and semantic skins are programmable. The buttons serve the purpose of providing simple or single click entry of data and minimizes the friction for a user to collect information and bind the information to services.

FIG. 8, FIG. 9, FIG. 10, and FIG. 11 include details of a functional embodiment of the present invention. The exemplary embodiment shown in FIG. 8, FIG. 9, FIG. 10, and FIG. 11 are directed to social network services, such as Facebook.com and Twitter.com, though its extension to other services can be appreciated by one of ordinary skill in the art. The present invention is not limited to the embodiment of FIG. 8, FIG. 9, FIG. 10, and FIG. 11; alternatives to the services and applications described in FIG. 8, FIG. 9, FIG. 10, and FIG. 11 can be identified by one of ordinary skill in the art.

Figure 8:
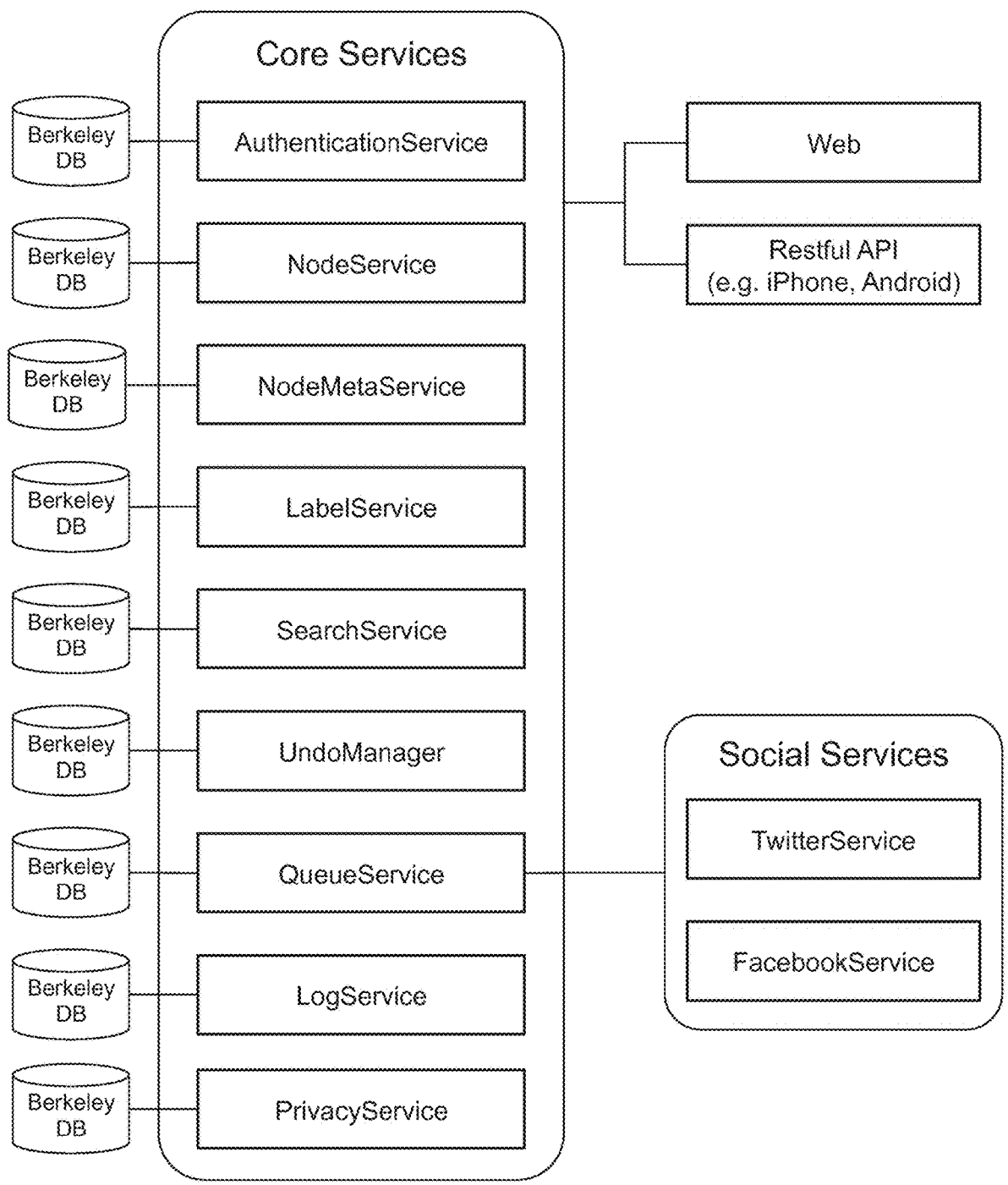
FIG. 8 shows the core services of an exemplary embodiment of the present invention.
Figure 9:
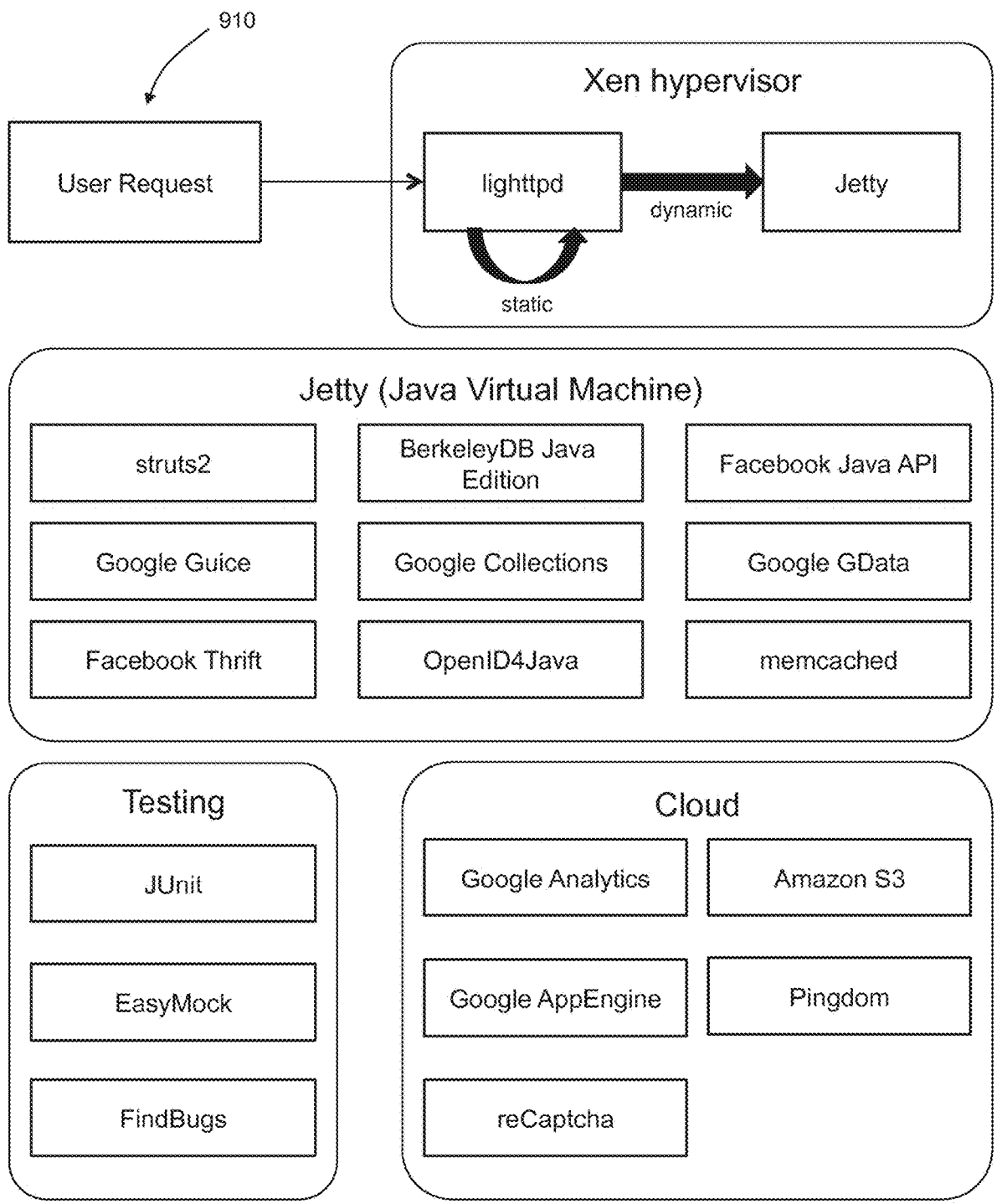
FIG. 9 shows the technology services underlying the core services shown in FIG. 8.

FIG. 8 and FIG. 9 show the technologies used by the application server in an exemplary embodiment of the present invention. The core services are shown by FIG. 8 and include the AuthenticationService, NodeService, NodeMetaService, LabelService, SearchService, UndoManager, QueueService, LogService, and PrivacyService. Each of the core services has its own instance of a BerkeleyDB Java Edition as a backing store. FIG. 9 shows an initial user request 910 that is handled by a web server, e.g. lighttpd. Lighttpd serves up all the static content. If the request is for dynamic content then it is forwarded to the Jetty Java Application Server. Jetty runs inside of the Java Virtual Machine. In the embodiment shown in FIG. 9, the struts2 web framework is used inside of Jetty. Struts2 determines which services are needed to fulfill the request and uses Google Guice to create all the objects needed by the user. After all the objects have been created, struts2 fulfills the users request and generates the page. The jQuery JavaScript library is used to speed up and simplify cross-platform development. Google collections Library is used to augment the standard Java collections.

Figure 10:
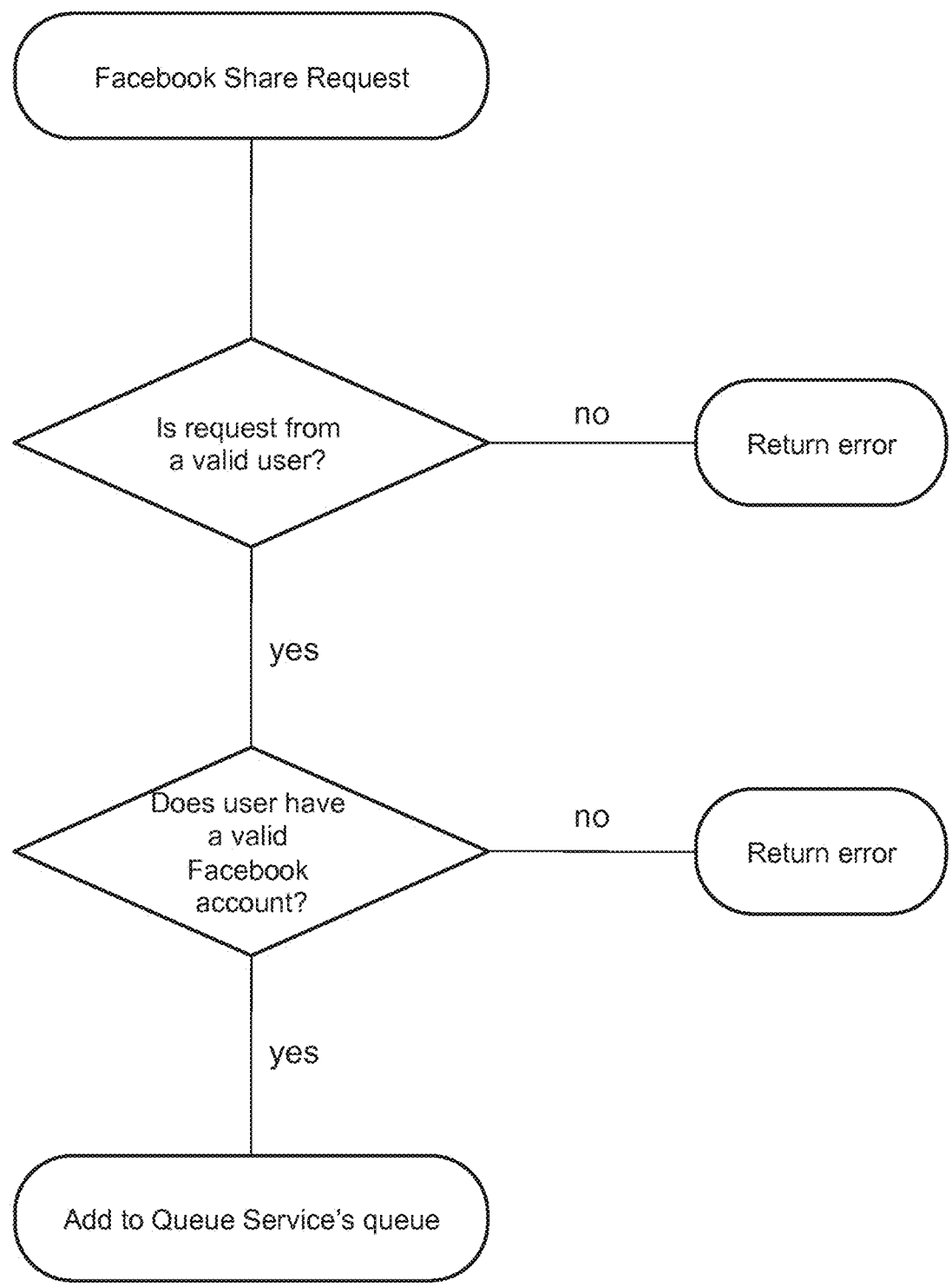
FIG. 10 shows a flow chart of an example login and authentication function in an exemplary embodiment of the present invention.

FIG. 10 shows a flow chart related to the AuthenticationService of an exemplary embodiment of the present invention. The AuthenticationService allows a user to communicate with any service that requires authentication or login information; thereby the semantic note taking system can be integrated with any number of third party applications and services. In the example shown in FIG. 10, a user request to share a note on Facebook is shown. The request is handled by struts2, which checks if the user is a valid user of the semantic note taking system. If the request is from a valid user, a request is sent to the FacebookService to verify if the user has valid Facebook credentials. If the user has a valid Facebook account, the request is sent to the QueueService to en-queue the Facebook share request.

Figure 11:
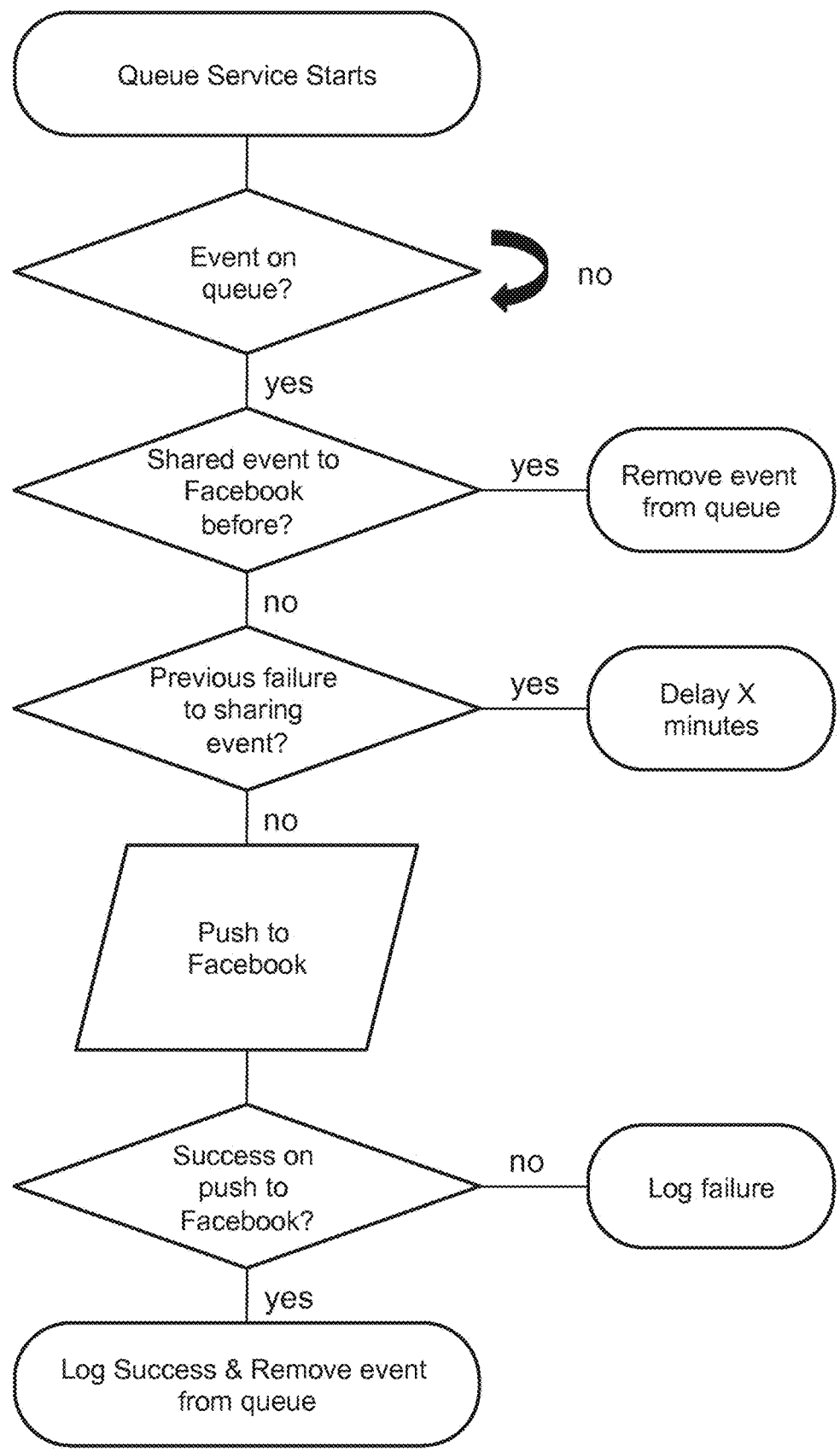
FIG. 11 shows a flow chart of an example Queue service according to an exemplary embodiment of the present invention.

FIG. 11 shows a flow chart related to an embodiment of the QueueService. When an event is en-queued in the QueueService's queue, the QueueService checks if the note associated with that event has been previously shared to Facebook. The LogService tracks when a note has been successfully shared to Facebook. If the note has been previously successfully shared, it is removed from the queue. The QueueService then checks if there was a problem sharing the note. If the note has had a failure, the share event is timed out and put back in the queue to be run after X minutes. The note is then pushed to the user's Facebook account. The note is pushed by the QueueService calling the FacebookService to fulfill the share request. If the request succeeds, the event is removed from the QueueService's queue and logged to LogService.

EXAMPLES

The following examples demonstrate exemplary applications for the embodiments of the present invention. It is noted that applications for the present invention are not limited by these examples; other applications of the present invention can be identified by one of ordinary skill in the art.

Example 1: Product Review

A user enjoys a product, such as a glass of wine. During a dinner engagement the user jots down information related to the wine, such as the brand, vintage, variety, etc., by accessing a user interface to the semantic note taking system. The note includes a label of "#wine" for future reference to the note. Context traits, including the GPS coordinates where the note was created is associated with the note. Using the GPS coordinates and accessing a directory information module, the name of the restaurant is derived and automatically associated with the note. The note is saved in the database.

At a later date, the user chooses to discuss the wine with friends of the user who may be wine enthusiasts. By binding the wine review note to a social network or an email application, the note is communicated to one or more friends of the user. One of the friends writes a brief review of the wine and attaches that review to the note. After the note has been shared to friends of the user, the user decides to write a wine review to be posted on a wine website. The user refines the note and binds it to the wine review website to be published to the world.

Example 2: Retail

Figure 12A:
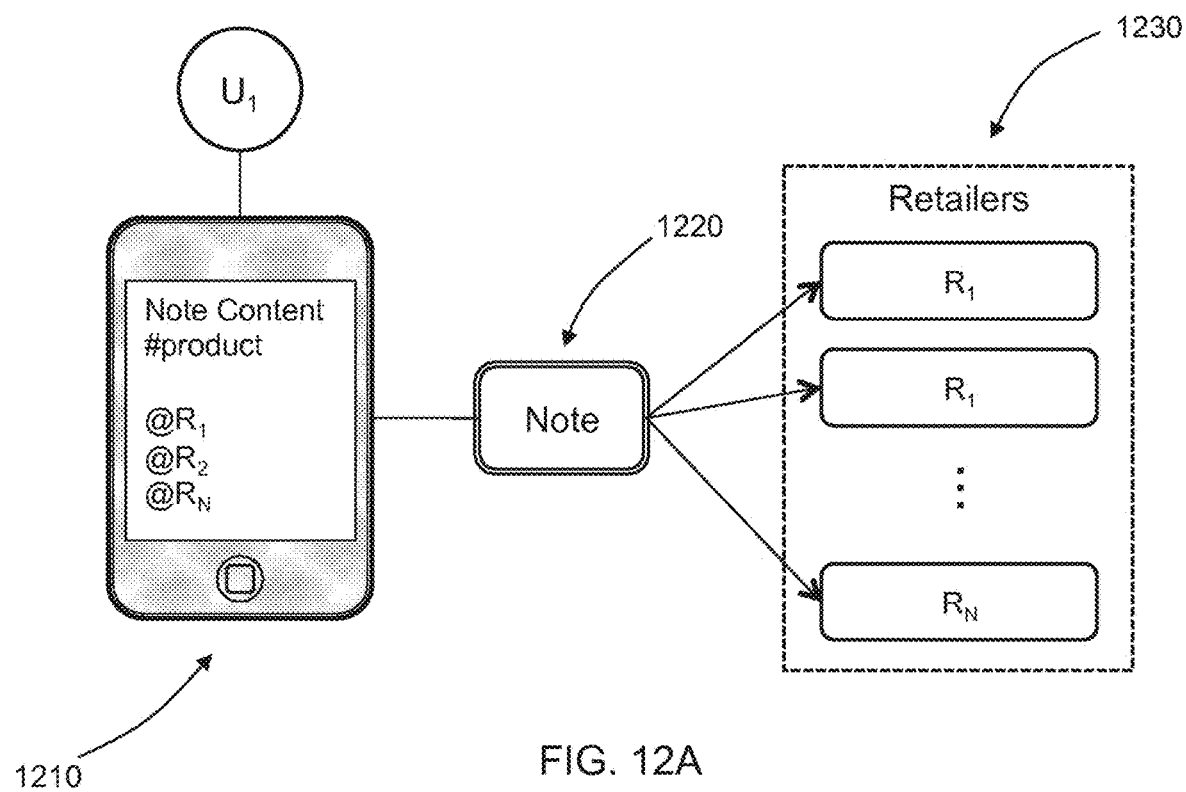
FIG. 12A and FIG. 12B shows an example of using semantic note taking with online retailers according to an embodiment of the present invention.
Figure 12B:
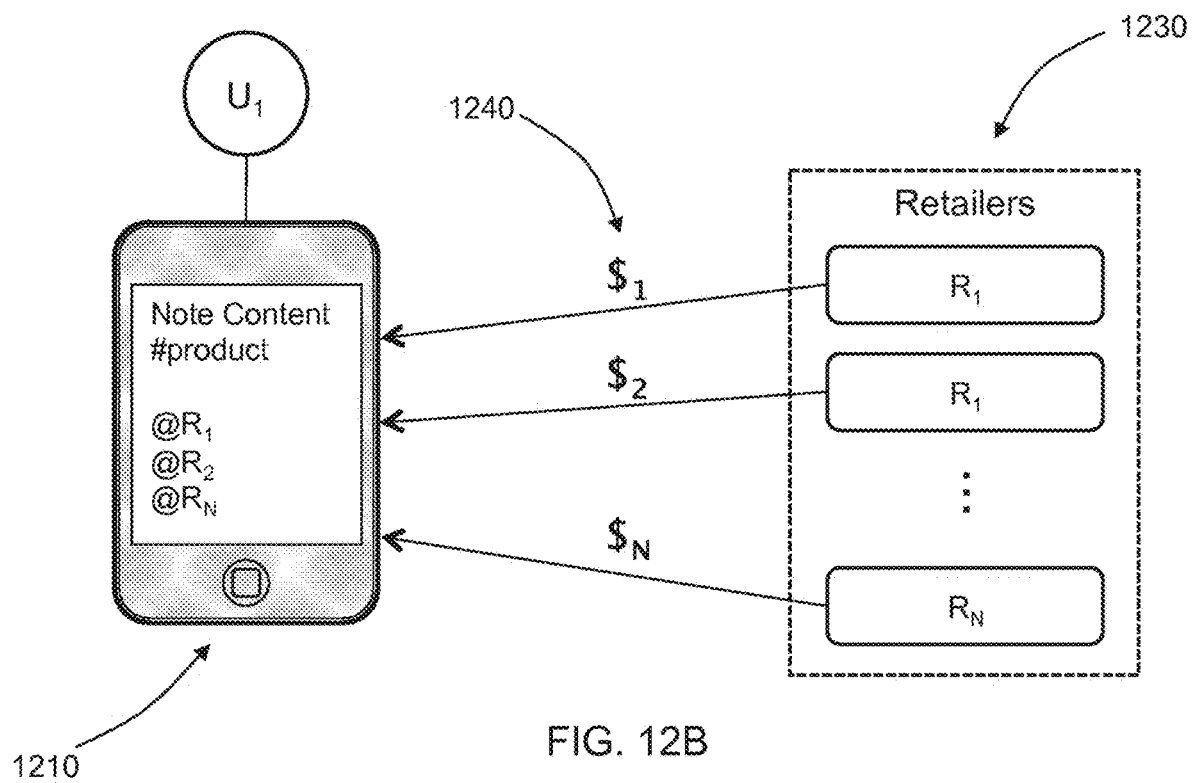

FIG. 12A and FIG. 12B show an example of a retail application with bidding from multiple online retailers 1230. In FIG. 12A, user $U_1$ creates a note 1220 on a user device 1210. The note 1220 includes an identification of a product and binding rules that indicate it is to be bound to retailers $R_1$, $R_2$, and $R_N$. The note 1220 is communicated to the retailers $R_1$, $R_2$, and $R_N$ based on the binding rules. After the note 1220 is received by the retailers $R_1$, $R_2$, and $R_N$, the retailers send offers 1240 to user $U_1$ for the product described in the note 1220. Alternatively or additionally, the retailers $R_1$, $R_2$, and $R_N$ can send advertisements, coupons, or any information relating to the product to the user $U_1$.

Example 3: Health

The present invention can be directed to a dietary, health, or medical service. For example, with minimal friction, a user can submit his or her dietary behavior to be tracked by a diet service. In another example, medical information can be collected at a hospital visit or doctor's appointment and submitted to an electronic medical record (EMR) application.

Example 4: Research

The semantic note taking system of the present invention can also be applied to a research study. In an embodiment of the present invention, research data is collected in a note. The research data can be collected from the field via a mobile device. The research data is enriched with time and location context traits. For repetitive data collection, a semantic skin would provide simple one click user entry of data. For example, the present invention can facilitate frictionless data gathering from door-to-door surveys. A door-to-door surveyor would need not enter the address of each participant of the survey as location context traits would be automatically associated with the note. Relevant data (e.g. resident names and demographics) can be automatically accessed based on the location context traits.

Another aspect of the present invention is directed to semantic note taking systems that link physical objects to the notes. In an embodiment, the system employs a two-dimensional bar code, such as a Quick Response (QR) code, that can be placed on or near a physical object. When imaged, the code links the physical object with one or more notes, such as by associating a public or private URL with the code. The QR code is preferably captured with a digital camera on a mobile phone, however, other methods of capturing the QR code can be used. The URL associated with the code can also be associated with notes from a semantic note taking system as described above, thereby the physical object is connected with the note.

The following describes an embodiment of a semantic note taking system and method with QR codes. First a note is created, enriched, and bound to services as described herein. A QR code is then generated and put on an object in the physical world. The object with the QR code is then viewed or imaged, preferably with a cell phone camera. As described above, the QR code is used to link the object with the note. It is important to note that contextual information can also be linked, including the location where the object was imaged, the history of the note, and other available contextual information. In addition, the note may be a shared note in an ad hoc network of users, therefore the other members of the ad hoc network are also linked with the imaged object.

In one embodiment, a private URL linked with the QR code and a note is available for users to bind with services or share with other users. In another embodiment, the QR code is linked with an encrypted link for restricted use, such as for managing private records of an organization. In this embodiment, encryption of the QR code can require an encryption key that is only possessed by authorized viewers, wherein the QR code is meaningless without the encryption key. An authorized viewer can view the QR code with his or her phone to generate encoded text, convert the encoded text using the encryption key into a link to a private URL. Encryption of the QR code allows it to be placed in public locations while maintaining privacy. For example, inventory located in a public location can be labeled with an encrypted QR code that allows authorized personnel to view the link associated with the QR code, but prevents any unauthorized views.

In an embodiment, a note is a shared note between one or more users and a QR code is used to link physical objects with the shared note. The shared note includes a chronology and history of related comments, replies, and links to objects and/or locations. For example, the shared note includes a chronological list of items, such as user comments and postings, with the latest item at the top of the list. It is noted that one or more of the items includes links with objects labeled with a QR code.

In another embodiment, a shared note is related to a physical object labeled with a QR code. The note includes enriched and contextual information related to the object and a list of items (e.g. comments and replies) shared to the community of users having access to the shared note. Preferably, the items are listed in chronological order.

Figure 13A:
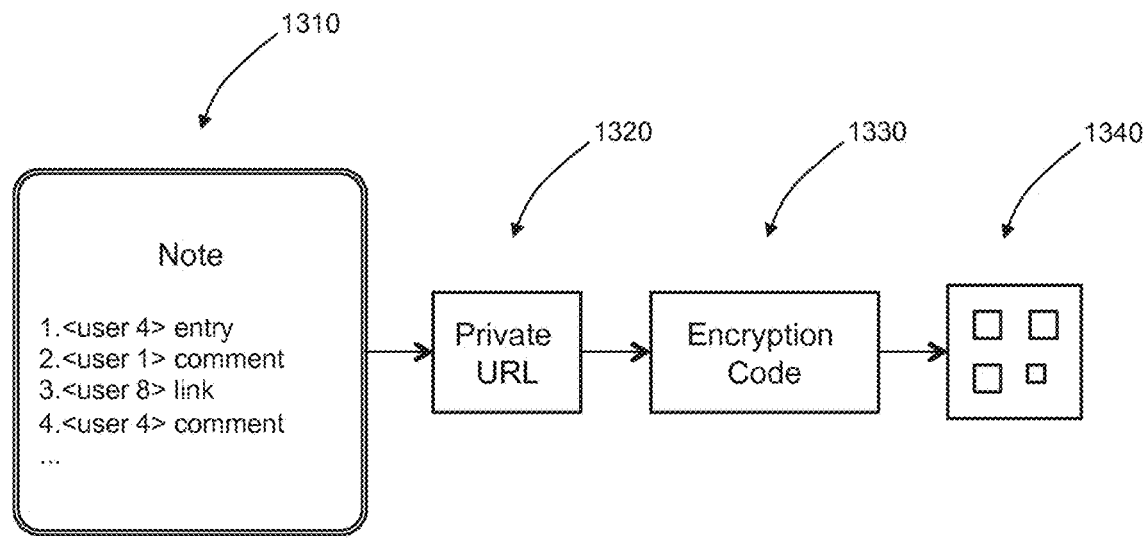
FIG. 13A and FIG. 13B show an example of generating a note summary and private URL from a note, encrypting the note summary and private URL to form encoded text, generating a two-dimensional QR code from the encoded text, and accessing the note by decrypting the encoded text to identify the private URL according to an embodiment of the present invention.
Figure 13B:
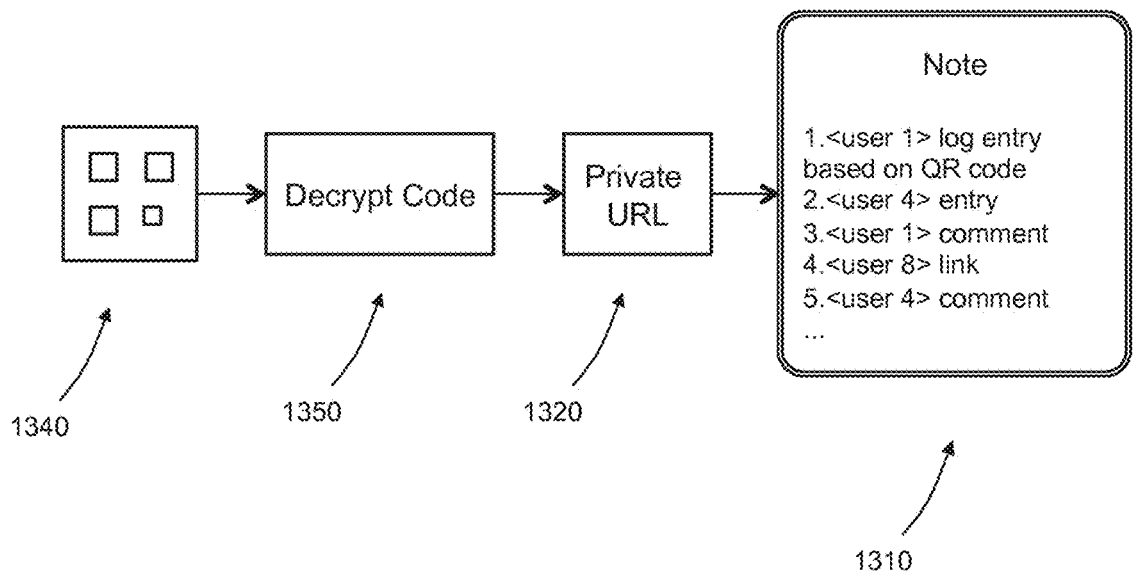

FIG. 13A and FIG. 13B show a preferred embodiment of the present invention with automatic generation of a QR code from a shared note and accessing the note using the QR code. FIG. 13A shows a shared note 1310 with a list of user entries. The shared note 1310 can include a conversation between multiple users. Preferably, the comments and entries in the conversation are listed in chronological order with the most recent entry at the top. A private URL 1320 is associated with the note. The private URL 1320 provides a link to the entire conversation of the shared note 1310 and all of the content of the shared note 1310. An encryption code 1330 is generated to allow only authorized users from accessing the private URL 1320, and thereby the shared note 1310. A matrix code, such as a QR code 1340, is automatically generated to provide a link between the note and a physical object.

FIG. 13B shows an exemplary process of updating the shared note 1310 using the QR code. First, the QR code 1340 is viewed or imaged by a user, such as by placing the QR code 1340 proximate to a physical object of interest and imaging the QR code 1340 with a cell phone camera. If the user is an authorized user with the proper encryption key, the user can then decrypt the encoded text in the QR code 1350 to reveal the private URL 1320. The private URL 1320 provides a link to the shared note 1310 and the user can add an entry into the conversation in the shared note 1310. In the embodiment shown in FIG. 13B, the new user entry is placed at the top of the shared note 1310 as it is the most recent entry.

It is important to note that the QR code 1340 allows for a back and forth between one or more physical objects with a shared note 1310. In other words, the process of FIG. 13A and FIG. 13B can be repeated any number of times, thereby physical objects labeled with the QR code 1340 become linked with the conversation of the shared note 1310.

The following is a list of example applications for semantic note taking with QR codes. It is noted that this list is not exhaustive and one of ordinary skill in the art will appreciate alternative applications or changes to these applications.

Figure 14:
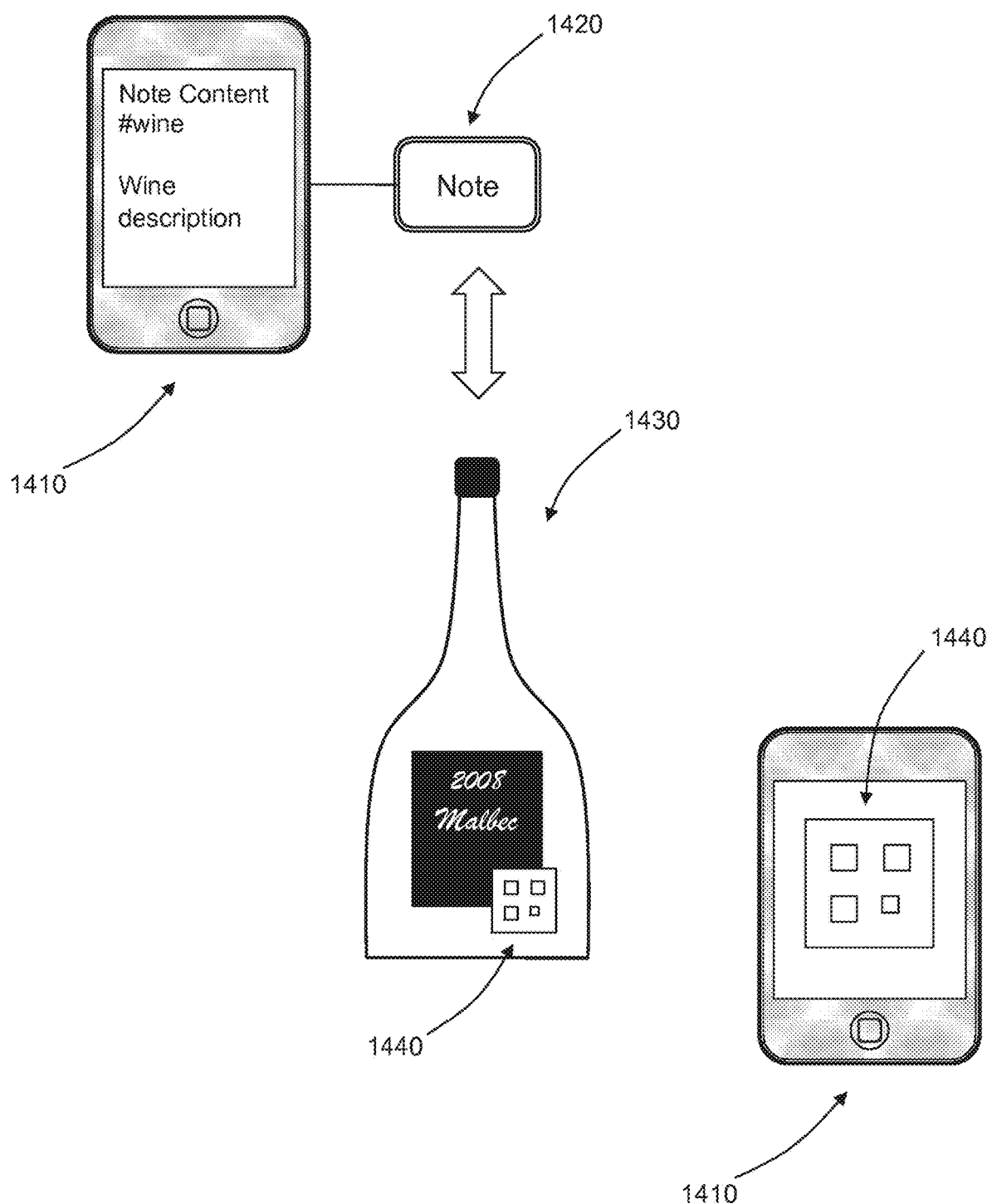
FIG. 14 shows an example of linking a semantic note with a physical object through a two-dimensional bar code according to an embodiment of the present invention.

Home or office inventory: QR codes and semantic notes can be used to inventory items in the home or office. For example, QR codes can be attached to wine bottles in a wine cellar and linked to the corresponding wine review notes. FIG. 14 shows an example of linking a physical object (e.g. wine bottle 1430) with a note 1420. A QR code 1440 is attached to the wine bottle 1430. The note can be written on a mobile phone 1410 and the QR code 1440 can be captured with the camera on the same mobile phone 1410 or a different phone.

Health, Diet, and Exercise: QR codes can be attached to medication to track use and refills. Food labels can rely on QR codes for a diet log. Exercise equipment can have QR codes to manage an exercise regimen.

Equipment service and repair: By affixing QR codes to equipment and linking them with notes, a usage and repair history of the equipment can be stored and monitored. The QR codes can be encrypted for equipment that is accessible in a public location.

Janitorial: QR codes can be used for documenting cleaning and inspections.

Location awareness: By placing QR codes at a particular location (e.g. a restaurant, place of interest, etc.), a user can track and remember where they had a certain experience that is described in a note.

In an additional embodiment, the invention can be used to motivate positive behavior change by a sense of progress. To achieve this sense of progress, we need to be able to measure and quantify the experiences that are on the trajectory toward the behavior change goal. Furthermore, to understand the ups, downs, and gaps, we need to annotate that progression with other experience data from the lifestream. The experiences that may be the most relevant to the behavior change goal are often not in the same stream as the key progression metric.

There is a discontinuity between behavioral metrics and related experience data. For example, with hypertension the experience data is blood pressure, while the behavioral metrics is the consumption of fat and salt or life experiences and relationships that cause stress. In obesity, the experience data is weight, while the behavioral metrics is diet and exercise or life experiences and relationships that enhance or interfere with positive behavior change. With fitness, the experience data is the frequency and duration of exercise, while the behavioral metrics is the available time and environmental factors or life experiences and relationships that enhance or hinder progress.

Examples of experiences and relationships that enhance or hinder progress are for example people who nourish and encourage versus people who provide negative feedback, people who engage in similar or contrary behaviors to the desired behaviors, work and family schedule that appear to leave little time, work and family relationships that cause stress versus relationships that reduce stress, environmental factors and locations, new priorities and interests that distract from behavior change goals, and/or financial factors.

Sources of experience data can come from a variety of areas such as social network environments (e.g. Facebook, Twitter and other blogging platforms), financial services (e.g. Mint.com), note services (e.g. Evernote), location check-in apps (e.g. Foursquare), email, photo-sharing services (e.g. iPhoto) or calendars. Social networking platforms can be a source of positive and negative reinforcing relationships through identification of who comments on posts together with sentiment analysis of those comments. They can also reflect interests and identify source of potential new supporters and encouragers who are not yet connected to the user. Financial services can reflect stress and competing priorities for time and attention to behavior change goals. Note services can identify interests, changing priorities, as well as work/home life balance and location. Location check-in apps can identify location, interests, and new social connections that can support behavioral goals. Email can identify relationship patterns and communication frequency, and a sentiment analysis. Photo sharing services can provide location, priorities, interests, mood, or the like. Calendars provide insight in social activity level, work/home life balance, available time, priorities, or the like.

Behavior-related metrics can be quantified by various sources, for example, without limitation: fitbit and other pedometers, sensors in smartphones indicating location motion, withings and other electronic scales that can publish weight to the cloud or to smartphones, blood pressure, blood glucose, respiratory monitoring and other medical devices that can publish data to the cloud or to smartphones, thermometers that can indicate illness, exercise loggers such as Runkeeper.com, or any other depending on the type of behavior that one would like to quantify.

Sources of quantified behavioral data can be Catch.com mobile Apps that allow for user-defined shortcuts for logging data. It further allows for the integration with third party applications that generate structured data. It also allows for semantic analysis of free-text, imaging or voice information for quantified parameters. For example, frequency tags, frequency and timing of words and phrases, sentiment analysis, stress prediction from voice notes. Another example is same semantic analysis that also run against third party data from other linked services. Apps like Catch.com further allow for capturing phone sensor data as context and can harvest data from other devices in the vicinity through near field communications (NFC).

Figure 15:
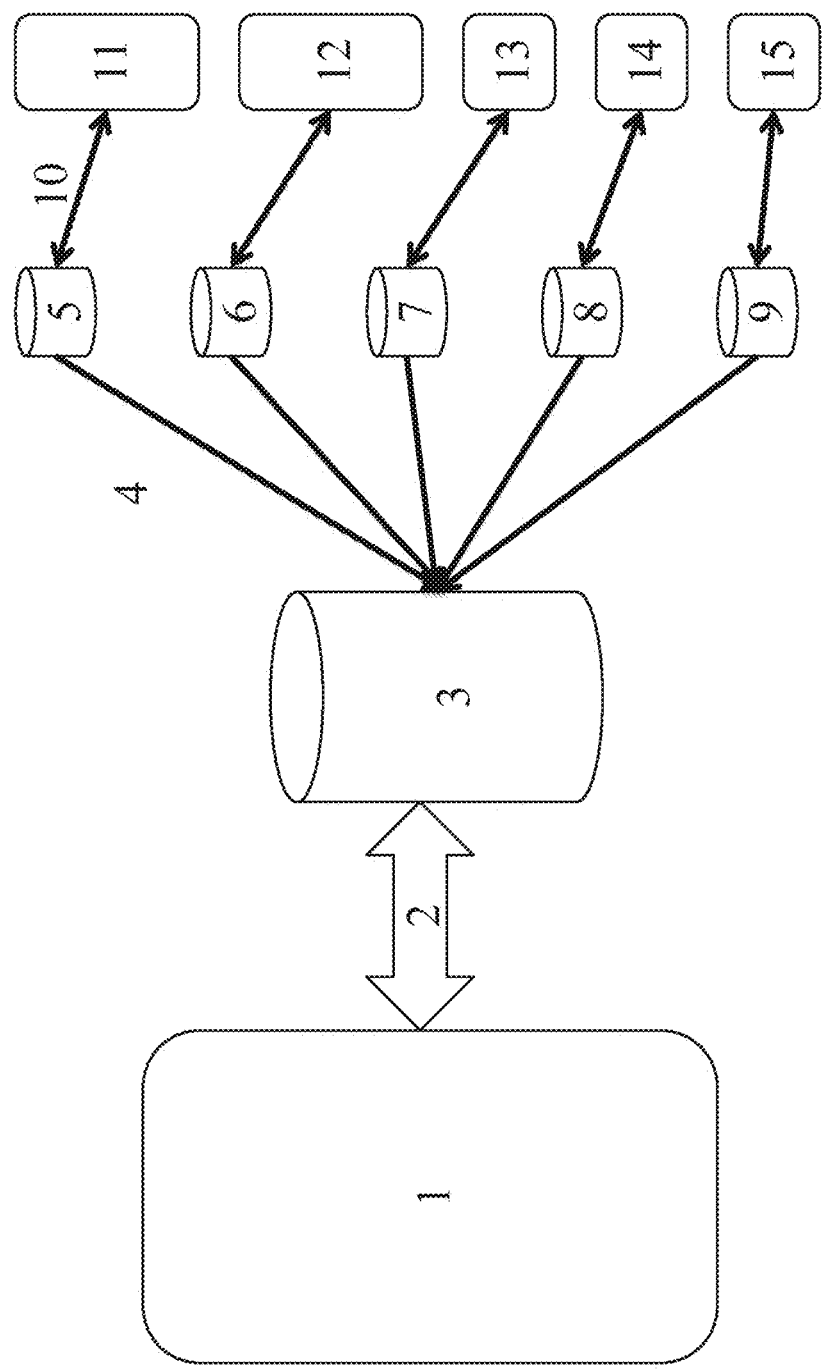
FIG. 15 shows an example of an outline of a structure with experience data sources annotating behavioral progress application according to an embodiment of the present invention.

FIG. 15 shows an example of a system outline of a structure with experience data sources annotating behavioral progress application, which the following items:
1. Catch lifestream application.
2. Catch mobile App communication with Catch cloud via Catch API.
3. Catch lifestream data and annotations (metadata attached to experiences captured in Catch).
4. Communication with third party services via API.
5. Facebook and other social networks.
6. Evernote and other note services.
7. Gmail and other email services.
8. Fitbit, Withings, and other devices that publish to cloud services with open APIs.
9. Other devices and services.
10. Third party cloud-based services communication with their own data capture devices.
11. Facebook and Twitter, web or mobile client.
12. Evernote mobile client or desktop App.
13. Gmail web or mobile client.
14. Fitbit pedometer, Withings scale or other sensor-based devices.
15. Other devices or interfaces that send data to cloud-based services.

Figure 16A:
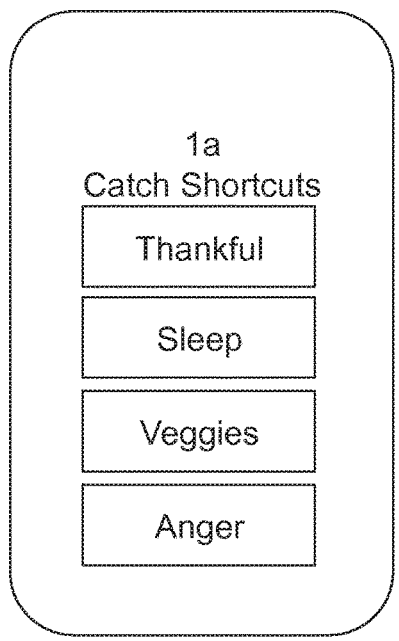
FIG. 16A, FIG. 16B, and FIG. 16C show examples of Catch.com functions and annotated lifestream according to an embodiment of the present invention.
Figure 16B:
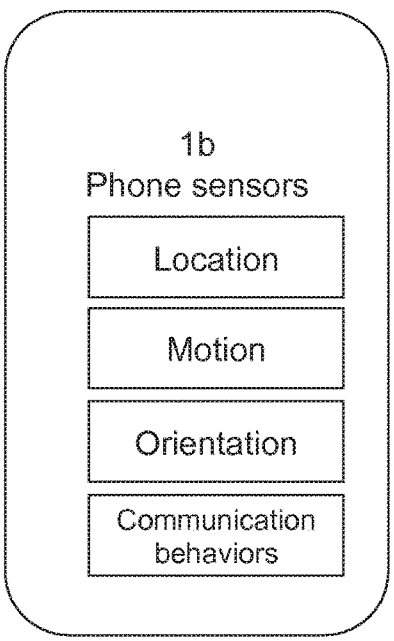
Figure 16C:
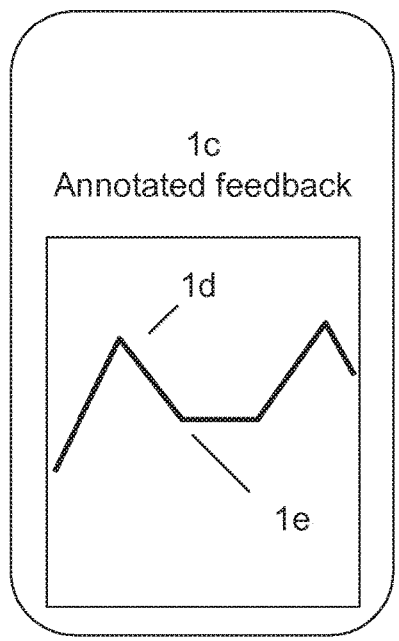

FIG. 16A, FIG. 16B, and FIG. 16C show examples of Catch.com functions and annotated lifestream. In FIG. 16A, FIG. 16B, and FIG. 16C, we show:
1a: Shortcuts that capture more structured information and add it to the Catch note stream as an annotation. These shortcuts also can come from templates designed by third parties.
1b: In-phone data sources that are attached to each note, including the notes generated by the shortcuts in 1a as well as any other information captured on the phone that is added to the Catch note stream.
1c: Annotated feedback
  For the behavioral parameters that the user decides to track, the app can graph and chart the data.
  Ups, downs, and gaps are enriched by coincident data from the stream.
  Coincident data can be from Catch notes or any third party service with a linked account to Catch.
1d Example: peak is coincident with a note in Evernote, and would be flagged as such.

Clicking on the 1d note would bring the user to the source data.
1e Example: decline or gap could be informed by an email message or Facebook post that was coincident.

In summary, this embodiment provides a behavioral modification system whereby a mobile phone is able to run applications that log user behavior and phone sensor data. The system has the ability to link accounts to third party information capture sources with time-stamped data. It further has the ability to define quantified metrics and to chart progress against such metrics. It also has the ability to chart progress metrics with flags for coincident information with ups, downs and gaps in progress metric. Yet other abilities are, the ability to identify directional changes, ups, downs, gaps in progress metric and (e.g. ability to identify associated friend or social communications), ability to identify associated locations, ability to identify associated interests, priorities, and other information that is based on semantic and sentiment analysis of content from third party services, location data, tags and metadata, and device measurements.

In other embodiments, we described the idea of being prompted by the application for data entry based on location and other context. We also described using context such as location and orientation of the phone to help determine the content of data captured from imaging. In yet another embodiment, the invention expands the idea to include templates or software modules that are selected and run within Catch based on context.

Catch is a personal content management system that is easy to adapt and use for a wide variety of information capture scenarios. People use Catch for everything from expense reports and meeting notes, to recording images and notes about family and home life, to recording exercise and diet activities. Information can be viewed as separate activity streams based on tags, location, people, and other metadata. This embodiment, uses context more richly to tailor the Catch application to differentiate between home and work contexts, or between family life or self-improvement contexts.

FIG. 17A, FIG. 17B, FIG. 17C, and FIG. 17D show examples of context-aware modules for tracking, insights and coaching feedback. Referring to FIG. 17A, FIG. 17B, FIG. 17C, and FIG. 17D, templates can be associated with any combination of contextual data gathered on the phone. Examples include:
  Location: Home versus work, gym versus restaurant.
  Motion: In a vehicle versus stationary, patterns that indicate walking or jogging.
  Orientation: Pointing up or down, landscape versus portrait mode.
  Time of day: Morning activities versus evening.
  Past patterns and user curation of past associations: Looking at note history and associations, allowing user to correct associations and remembering those results.
  Objects in vicinity: Near field communications: near a weight scale or treadmill, near a cash register, other objects, at a business or retailer, anything identifiable via NPC.
  Day of week, month, season: Weekend versus weekday, holidays, seasonal factors, for example season in combination with location, motion.
  Communication behaviors: Phone, email, calendaring, existence or absence of appointments.

Figure 17A:
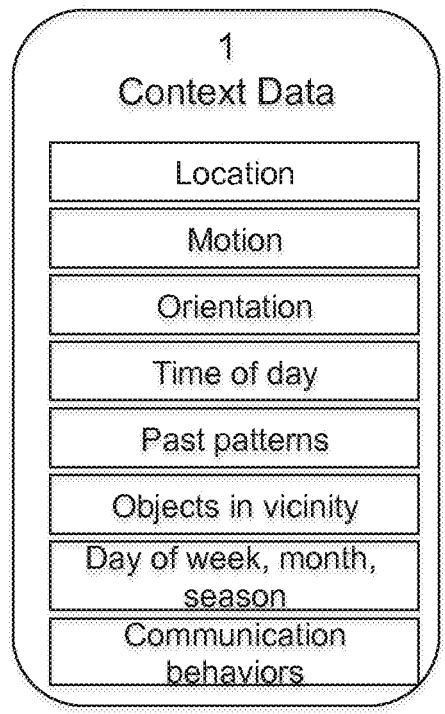
FIG. 17A, FIG. 17B, FIG. 17C, and FIG. 17D show examples of context-aware modules for tracking, insights and coaching feedback according to an embodiment of the present invention.
Figure 17B:
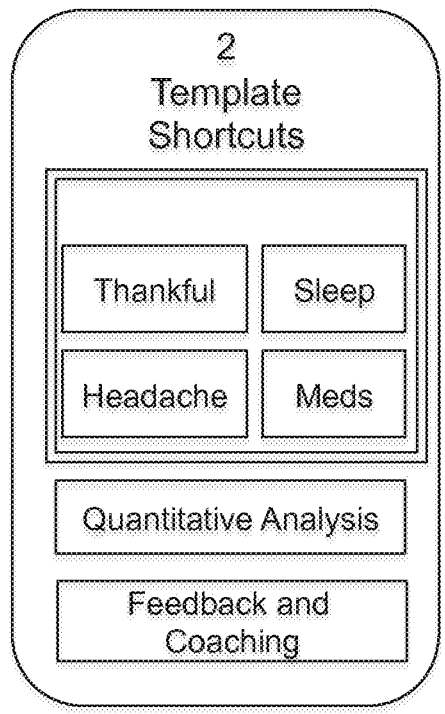

Referring to FIG. 17B, templates are modules that a user can load into Catch to add. Examples are shortcuts for capturing data with additional structure. Data can be stored as human readable notes annotated by data fields that are more easily machine readable. Another example is analytic rules defining which metrics should be charted with which other metrics, the scales and timeframes of those charts, and any pre-processing of data. Yet another example is content feeds for feedback and coaching, which could include rule-based content used to annotate a chart, or feeds of content from an expert source filtered based on user context and history. Templates can be user configurable, can be associated with a specific activity (such as scuba diving, fishing and other outdoor activities, hobbies, travel, cooking, diet, fitness), or can be associated with a partner or brand who develops and defines the shortcuts, analysis rules, and content feeds.

Figure 17C:
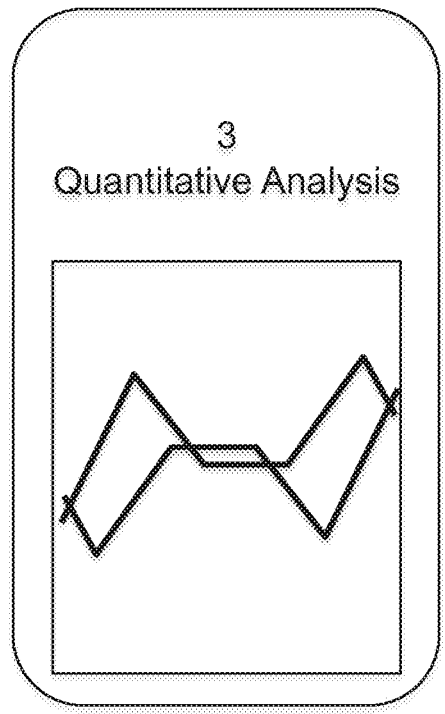

Referring to FIG. 17C and the quantitative analysis, each shortcut creates notes and annotations or metadata attached to notes. These metrics can be charted on a time scale. Rules for how metrics are charted include:

X and Y scales, as in which time period or range should the variable be viewed.

Chart type, such as bar, line, or scatter plot.

Other metrics that should be viewed on same chart at the same time.

Pre-processing of data, for example any formula that runs on the raw data or data in association with context to produce the result that will be charted.

Figure 17D:
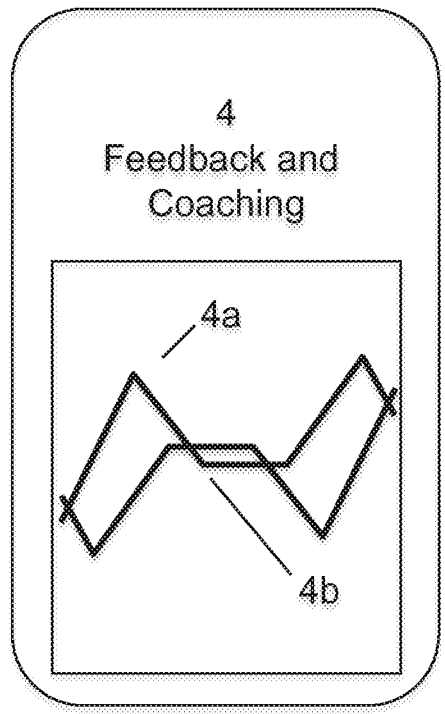

Referring to FIG. 17D, feedback and coaching, content from the module can be linked directly to the chart as a flag that can be clicked on to take the user to a more complete explanation. Content associated with graphs can be tagged to ups, downs, gaps, or any if-then scenario using data from the metrics or context as input. Content also can be displayed as a feed from the module sponsor or author. Content feeds would be filtered based on user data including profile, context, and trends in metrics.

Data sharing and privacy properties can be associated with a template. Examples of data captured with a template are:

for scuba divers could be shared with a research community aggregating data about the health of the coral reef.

associated with a health condition could be aggregated and shared with researchers studying disease progression.

developed by a pharmaceutical template could be shared with the sponsor for people losing weight or joining a fitness program could be shared with friends on Facebook or Twitter.
Each module can have a terms of service addendum that explains and qualifies the data sharing rules.

Figure 18C:
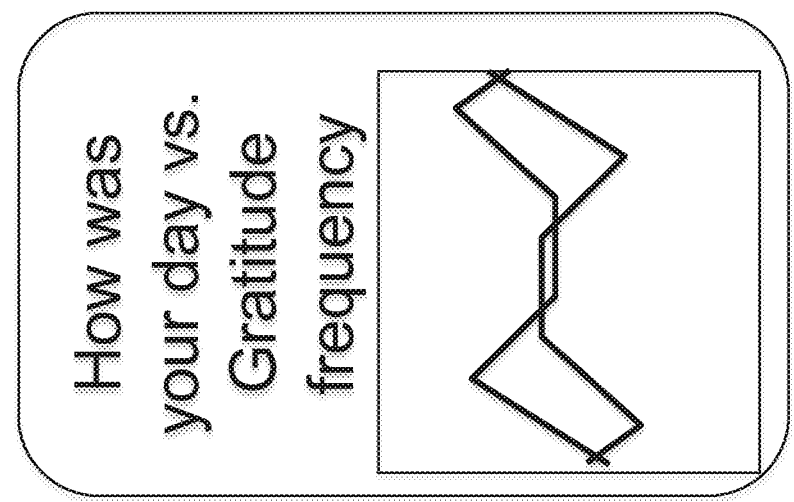
FIG. 18A, FIG. 18B, and FIG. 18C show examples of providing positive psychology and feedback to the user according to an embodiment of the present invention.
Figure 18B:
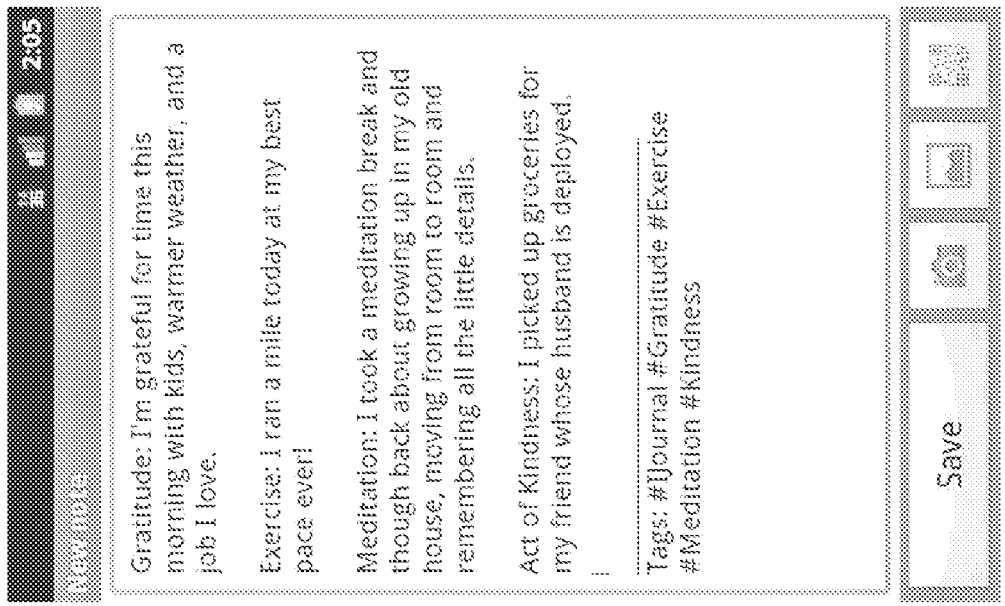
Figure 18A:
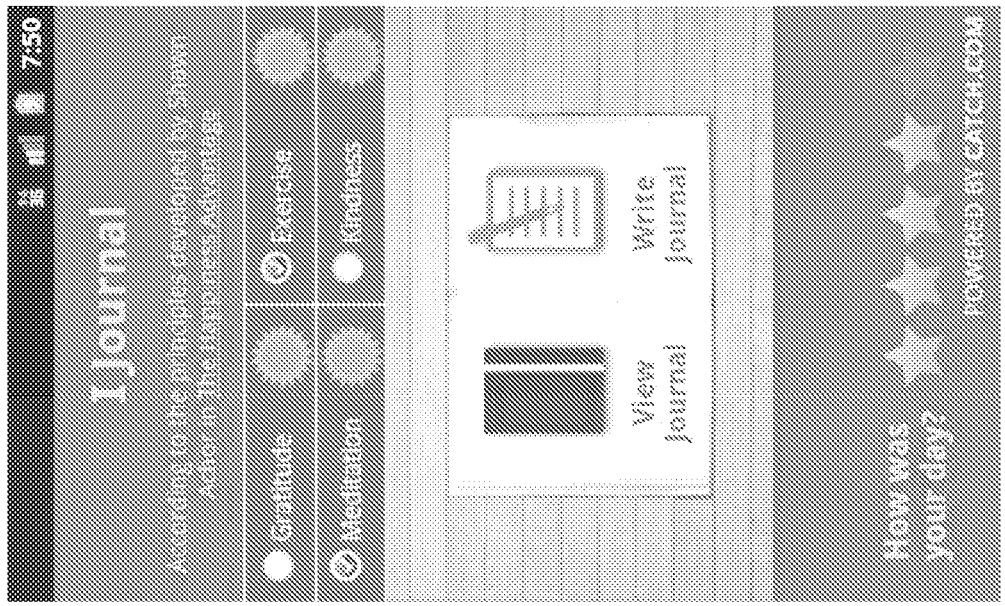
Figure 19:
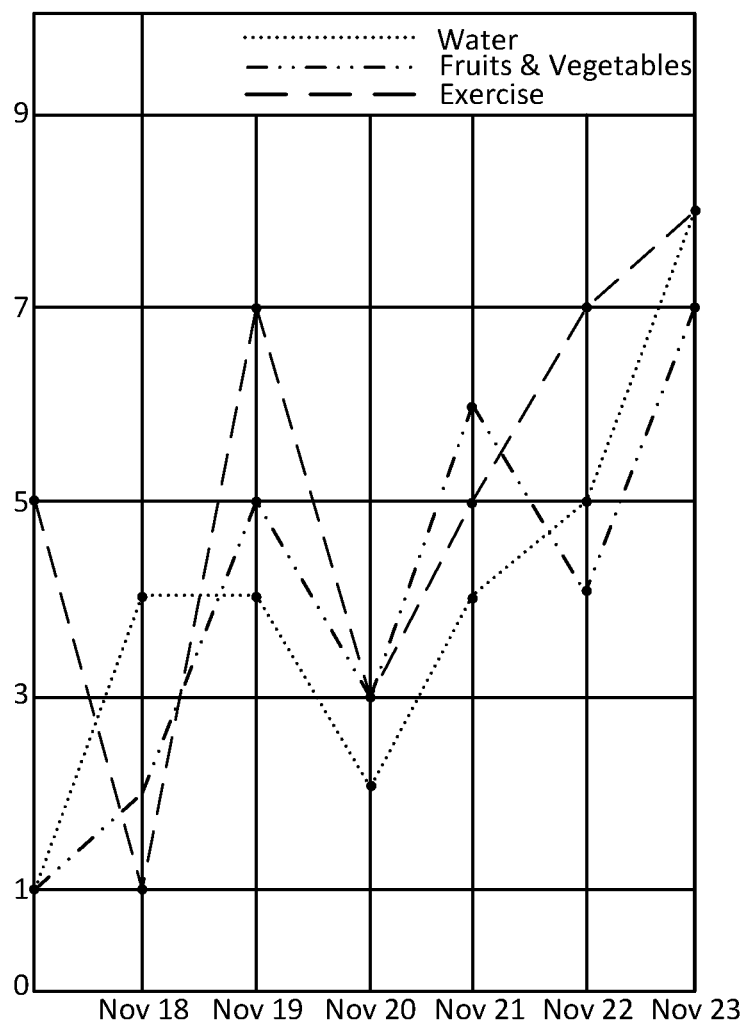
FIG. 19 shows an example of a Health tracker according to an embodiment of the present invention.
Figure 20A:
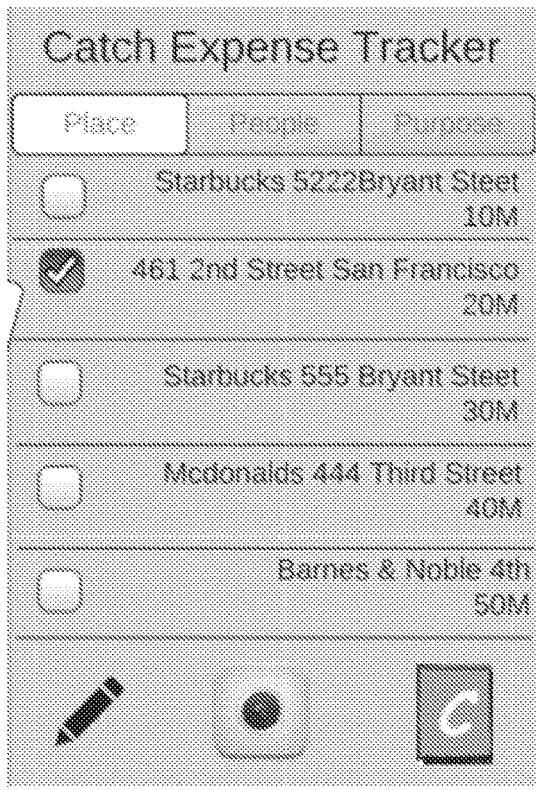
FIG. 20A, FIG. 20B, FIG. 20C, and FIG. 20D show examples of an expense tracker according to an embodiment of the present invention.
Figure 20B:
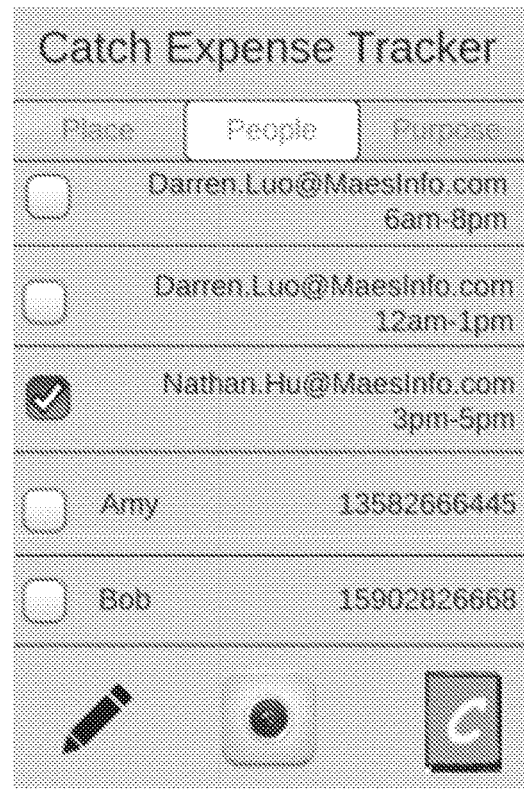
Figure 20C:
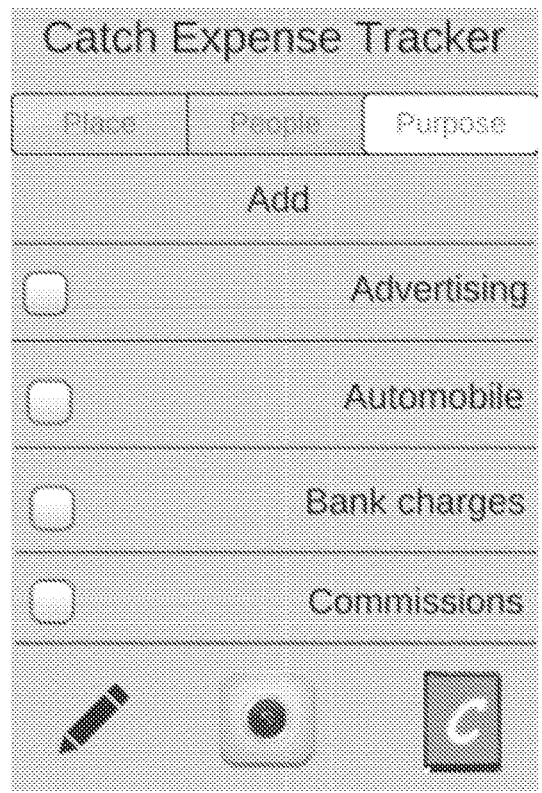
Figure 20D:

To provide positive psychology (e.g. FIG. 18A, FIG. 18B, and FIG. 18C), as a productivity tool sponsored by an employer, it could be the default module during working hours. Anonymous data is shared with research team studying the relationship between outcomes and adherence. In an example, Health tracker, as shown in FIG. 19, could be the set as a default module during mealtimes or when location is related to a previous pattern tagged as exercise. Data from the module could be automatically shared with a specified friend list. Data could be aggregated for a group contest. For example, a group of friends or employees challenging each other to maintain a health regimen In an example of an expense tracker, as shown in FIG. 20A, FIG. 20B, FIG. 20C, and FIG. 20D, if the context is a restaurant during business hours use this template by default, but not on weekends and holidays. In the Expense tracker, shortcuts could include place or business where expense occurred, people who were present, and business purpose: all the data needed for expense reports for an employer. Data could be automatically shared with the company accountant. Analysis rules could include formatting and totaling expense data by category.

In summary of the embodiment, we provide a personal information capture note-taking system on a mobile device, including a loadable module with shortcuts and rules for processing captured information. Content can be captured from the loadable module that categories data input for subsequent analysis. Data can be displayed in a chart based on rules in the module. Additional content can be associated to the data in the chart based on filters or rules. The loadable module can be selected and displayed based on context data collected in the mobile device. Sharing rules can be associated with a module. Data can be annotated in the notes database with quantitative data in addition to unstructured data captured in notes. Annotations are machine readable fields that are attached to a note as metadata. Context can be captured in association with notes and using this context to determine which of a plurality of loadable modules should process the data.

What is claimed is:

1. A method comprising:
receiving input content from a capturing device;
determining a context for the input content;
enriching the input content, based on the determined context, to add semantic meaning to the input content;
determining a service to bind the enriched input content to based on the enriched input content and the determined context, wherein the determined service is selected from a plurality of services based on the enriched input content and the determined context; and
binding the enriched input content to the determined service, wherein the binding of the enriched input content to the determined service comprises making the enriched input content accessible to the determined service.

2. The method of claim 1, wherein the plurality of services includes one or more of: websites, applications, an online entity, and social networks.

3. The method of claim 1, wherein the context is provided in the input content.

4. The method of claim 1, wherein the context is determined from a current operation of the capturing device.

5. The method of claim 1, the input content is audio media.

6. The method of claim 1, wherein the input content is recorded data.

7. The method of claim 1, wherein the input content is a message to post to social media.

8. The method of claim 1, further comprising:
authenticating a user account with the determined service prior to making the enriched input content accessible to the determined service.

9. The method of claim 1, wherein determining the service to bind the enriched input content to based on the enriched input content and the determined context includes:
outputting, based on the enriched input content and the determined context, a suggestion identifying the determined service and an additional service; and
receiving, from the capturing device, input indicating a selection of the determined service.

10. At least one non-transitory computer readable medium comprising instructions stored thereon, when executed the instructions effective to cause at least one computing system to:
receive input content from a capturing device;
determine a context for the input content;

enrich the input content, based on the determined context, to add semantic meaning to the input content;

determine a service to bind the enriched input content to based on the enriched input content and the determined context, wherein the determined service is selected from a plurality of services based on the enriched input content and the determined context; and bind the enriched input content to the determined service, wherein the binding of the enriched input content to the determined service comprises making the enriched input content accessible to the determined service.

11. The at least one non-transitory computer readable medium of claim 10, wherein the plurality of services include one or more of: websites, applications, an online entity, and social networks.

12. The at least one non-transitory computer readable medium of claim 10, wherein the context is determined from a current operation of the capturing device or is provided in the input content.

13. The at least one non-transitory computer readable medium of claim 10, wherein the input content is a message, and the determined service to bind the enriched input content is a social media service.

14. The at least one non-transitory computer readable medium of claim 10, wherein the instructions are further effective to cause the at least one computing system to:
authenticate a user account with the determined service prior to making the enriched input content accessible to the determined service.

15. The at least one non-transitory computer readable medium of claim 10, wherein the instructions being effective to cause the at least one computing system to bind the enriched input content to the determined service comprises the instructions being effective to cause the at least one computing system to make the enriched input content accessible to the determined service using an application programming interface of the determined service.

16. A system comprising:
at least one computer readable medium for storing instructions; and
at least one processor to execute the stored instructions, the instructions effective to eau se the at least one processor to:
receive input content from a capturing device;
determine a context for the input content;
enrich the input content, based on the determined context, to add semantic meaning to the input content;
determine a service to bind the enriched input content to based on the enriched input content and the determined context, wherein the determined service is selected from a plurality of services based on the enriched input content and the determined context; and
bind the enriched input content to the determined service, wherein the binding of the enriched input content to the determined service comprises making the enriched input content accessible to the determined service.

17. The system of claim 16, wherein the plurality of services includes one or more of websites, applications, an online entity, and social networks.

18. The system of claim 16, wherein the input content is a message, and the determined service to bind the enriched input content is a social media service.

19. The system of claim 16, wherein the instructions are further effective to cause the at least one processor to:
authenticate a user account with the determined service prior to making the enriched input content accessible determined to the determined service.

20. The system of claim 16, wherein instructions being effective to cause the at least one processor to bind the enriched input content to the determined service comprises the instructions being effective to cause the at least one processor to make the enriched input content accessible to the determined service using an application programming interface of the determined service.

* * * * *

UNITED STATES PATENT AND TRADEMARK OFFICE
CERTIFICATE OF CORRECTION

PATENT NO. : 10,931,736 B2  
APPLICATION NO. : 15/797607  
DATED : February 23, 2021  
INVENTOR(S) : Stephen J. Brown et al.

Page 1 of 1

It is certified that error appears in the above-identified patent and that said Letters Patent is hereby corrected as shown below:

In the Claims

Claim 5, at Column 18, Line 44, insert --wherein-- after - The method of claim 1, -

Claim 16, at Column 20, Line 2, replace "eau se" with - cause -

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*